United States Patent
Li et al.

(10) Patent No.: US 11,924,753 B2
(45) Date of Patent: Mar. 5, 2024

(54) POWER SAVING OF SMART REPEATERS BASED ON A TRIGGERING SIGNAL

(71) Applicant: QUALCOMM Incorporated, San Diego, CA (US)

(72) Inventors: Junyi Li, Chester, NJ (US); Navid Abedini, Somerset, NJ (US); Ashwin Sampath, Skillman, NJ (US); Raju Hormis, New York, NY (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/943,899

(22) Filed: Jul. 30, 2020

(65) Prior Publication Data

US 2021/0037459 A1 Feb. 4, 2021

Related U.S. Application Data

(60) Provisional application No. 62/881,891, filed on Aug. 1, 2019.

(51) Int. Cl.
*H04B 17/00* (2015.01)
*H04B 17/327* (2015.01)
(Continued)

(52) U.S. Cl.
CPC ...... *H04W 52/0206* (2013.01); *H04B 17/327* (2015.01); *H04W 84/047* (2013.01); *H04W 92/12* (2013.01)

(58) Field of Classification Search
CPC .......... H04W 52/0206; H04W 84/047; H04W 92/12; H04W 84/04; H04W 52/02; H04W 84/022; H04B 17/327; Y02D 30/70
See application file for complete search history.

(56) References Cited

U.S. PATENT DOCUMENTS 10,084,527 B1 * 9/2018 Marupaduga ......... H04W 72/21
10,608,678 B1 3/2020 Hormis et al.
(Continued)

OTHER PUBLICATIONS (Huawei: "Text proposal for Relay TR, section 8.4", 3GPP Draft; R4-103006, 3rd Generation Partnership Project (3GPP), Mobile Competence Centre ; 650, Route Des Lucioles ; F-06921 Sophia-Antipolis Cedex), Aug. 2010.*

(Continued)

*Primary Examiner* — Lakeram Jangbahadur
(74) *Attorney, Agent, or Firm* — Holland & Hart LLP/ QUALCOMM Incorporated

(57) ABSTRACT

Methods, systems, and devices for wireless communications are described. For example, the described techniques provide for wireless device (e.g., wireless repeater, wireless relay device, smart repeater, etc.) operation in a low power state, and base station signaling for triggering of wireless repeater control interface configuration. For example, a wireless repeater may operate in a power saving mode and monitor for control information from a base station according to a low power state or a slow state (e.g., according to a long monitoring periodicity relative to a monitoring periodicity associated with a full power state or fast state). Upon detection of triggering signal from a base station, the wireless repeater may transition to monitoring for control information from the base station according to a fast state (e.g., according to a short, or more frequent, monitoring periodicity relative to a monitoring periodicity associated with a low power state).

58 Claims, 18 Drawing Sheets

(51) Int. Cl.
*H04W 52/02* (2009.01)
*H04W 84/04* (2009.01)
*H04W 92/12* (2009.01)

(56) References Cited

U.S. PATENT DOCUMENTS

| | | | |
|---|---|---|---|
| 11,296,764 | B2 | 4/2022 | Hormis et al. |
| 11,297,567 | B2 | 4/2022 | Li |
| 2002/0028675 | A1 | 3/2002 | Schmutz et al. |
| 2010/0080139 | A1 | 4/2010 | Palanki et al. |
| 2011/0281579 | A1* | 11/2011 | Kummetz .......... H04B 7/15535 455/424 |
| 2012/0182930 | A1 | 7/2012 | Sawai |
| 2013/0064173 | A1 | 3/2013 | Sivavakeesar et al. |
| 2015/0223085 | A1 | 8/2015 | Siomina |
| 2016/0081031 | A1* | 3/2016 | Barriac ............ H04W 52/0261 370/311 |
| 2017/0086140 | A1 | 3/2017 | Xu et al. |
| 2018/0054781 | A1* | 2/2018 | Morioka ............... H04W 72/08 |
| 2018/0124718 | A1 | 5/2018 | Ng et al. |
| 2018/0249461 | A1 | 8/2018 | Miao et al. |
| 2019/0090299 | A1 | 3/2019 | Ang et al. |
| 2019/0123992 | A1 | 4/2019 | Ly et al. |
| 2020/0029316 | A1 | 1/2020 | Zhou et al. |
| 2020/0084819 | A1 | 3/2020 | Abedini et al. |
| 2020/0112381 | A1* | 4/2020 | Barnes ................ H04B 17/336 |
| 2020/0195310 | A1 | 6/2020 | Abedini et al. |
| 2020/0229237 | A1 | 7/2020 | Kim et al. |
| 2020/0280127 | A1 | 9/2020 | Hormis et al. |
| 2020/0280355 | A1 | 9/2020 | Abedini et al. |
| 2020/0280365 | A1 | 9/2020 | Abedini et al. |
| 2020/0280887 | A1 | 9/2020 | Abedini et al. |
| 2020/0295914 | A1 | 9/2020 | Hormis et al. |
| 2020/0314601 | A1 | 10/2020 | Hormis et al. |
| 2020/0322037 | A1 | 10/2020 | Abedini et al. |
| 2020/0351682 | A1 | 11/2020 | Cirik et al. |
| 2020/0382208 | A1 | 12/2020 | Hormis et al. |
| 2020/0403689 | A1 | 12/2020 | Rofougaran et al. |
| 2021/0021536 | A1 | 1/2021 | Ganesan et al. |
| 2021/0029736 | A1 | 1/2021 | Kim et al. |
| 2021/0036762 | A1 | 2/2021 | Abedini et al. |
| 2021/0036764 | A1 | 2/2021 | Li et al. |
| 2021/0037457 | A1 | 2/2021 | Li et al. |
| 2021/0037574 | A1 | 2/2021 | Li et al. |
| 2021/0044412 | A1 | 2/2021 | Li et al. |
| 2021/0067237 | A1 | 3/2021 | Sampath et al. |
| 2021/0352745 | A1 | 11/2021 | Yang et al. |
| 2021/0368367 | A1 | 11/2021 | Jiang et al. |

OTHER PUBLICATIONS

Huawei: "Text Proposal for Relay TR, Section 8.4", 3GPP Draft, R4-103006, 3GPP TSG-RAN WG4 Meeting RAN4 #56, 3rd Generation Partnership Project (3GPP), Mobile Competence Centre, 650, Route Des Lucioles, F-06921 Sophia-Antipolis Cedex, France, vol. RAN WG4, No. Madrid, Spain, Aug. 23, 2010, Aug. 17, 2010 (Aug. 17, 2010), XP050454101, pp. 1-3, [retrieved on Aug. 17, 2010] Sections 8.4.x.1, 8.4.x.2.1.

International Search Report and Written Opinion—PCT/US2020/044444—ISA/EPO—dated Oct. 29, 2020.

NTT Docomo, Inc: "Discussion on Enhancements to Support NR Backhaul Links", 3GPP Draft, 3GPP TSG RAN WG1 Meeting #95, R1-1813316, Discussion on Enhancements to Support NR Backhaul Links Final, 3rd Generation Partnership Project (3GPP), Mobile Competence Centre, 650, Route Des Lucioles, F-06921 Sophia-Ant, vol. RAN WG1, No. Spokane, USA, Nov. 12, 2018-Nov. 16, 2018, Nov. 11, 2018 (Nov. 11, 2018), XP051555343, 10 pages, pp. 1-9.

Qualcomm Incorporated: "Enhancements to Support NR Backhaul Links", 3GPP Draft, 3GPP TSG RAN WG1 Meeting #93, R1-1807393, 3rd Generation Partnership Project (3GPP), Mobile Competence Centre, 650, Route Des Lucioles, F-06921 Sophia-Antipolis Cedex, France, vol. RAN WG1, No. Busan, Korea, May 21, 2018-May 25, 2018, 16 Pages, May 12, 2018, XP051463084.

* cited by examiner

POWER SAVING OF SMART REPEATERS BASED ON A TRIGGERING SIGNAL

CROSS REFERENCE

The present application for patent claims the benefit of U.S. Provisional Patent Application No. 62/881,891 by Li et al., entitled "POWER SAVING OF SMART REPEATERS BASED ON A TRIGGERING SIGNAL," filed Aug. 1, 2019, assigned to the assignee hereof, and expressly incorporated by reference herein.

INTRODUCTION

The following relates to wireless communications, including managing repeaters.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

SUMMARY

A method of wireless communication at a wireless repeater is described. The method may include receiving a control interface triggering configuration from a base station, where the control interface triggering configuration includes power threshold information for powering of a control interface of the wireless repeater. The method may include receiving, from the base station, a periodic signal during a configured time period, measuring one or more energy levels associated with the received periodic signal across the configured time period based on the received control interface triggering configuration and configuring the control interface based on the one or more measured energy levels and the control interface triggering configuration.

An apparatus for wireless communication at a wireless repeater is described. The apparatus may include a processor and memory coupled with the processor. The processor and memory may be configured to receive a control interface triggering configuration from a base station, where the control interface triggering configuration includes power threshold information for powering of a control interface of the wireless repeater. The processor and memory may be configured to receive, from the base station, a periodic signal during a configured time period, measure one or more energy levels associated with the received periodic signal across the configured time period based on the received control interface triggering configuration and configure the control interface based on the one or more measured energy levels and the control interface triggering configuration.

Another apparatus for wireless communication at a wireless repeater is described. The apparatus may include means for receiving a control interface triggering configuration from a base station, where the control interface triggering configuration includes power threshold information for powering of a control interface of the wireless repeater. The apparatus may include means for receiving, from the base station, a periodic signal during a configured time period, measuring one or more energy levels associated with the received periodic signal across the configured time period based on the received control interface triggering configuration and configuring the control interface based on the one or more measured energy levels and the control interface triggering configuration.

A non-transitory computer-readable medium storing code for wireless communication at a wireless repeater is described. The code may include instructions executable by a processor to receive a control interface triggering configuration from a base station, where the control interface triggering configuration includes power threshold information for powering of a control interface of the wireless repeater. The code may include instructions executable by a processor to receive, from the base station, a periodic signal during a configured time period, measure one or more energy levels associated with the received periodic signal across the configured time period based on the received control interface triggering configuration and configure the control interface based on the one or more measured energy levels and the control interface triggering configuration.

Some examples of the method, apparatuses, and non-transitory computer-readable medium described herein may further include operations, features, means, or instructions for comparing the one or more measured energy levels to the power threshold information, where the power threshold information includes a power threshold for the one or more measured energy levels, a power profile for the configured time period, or both.

In some examples of the method, apparatuses, and non-transitory computer-readable medium described herein, configuring the control interface may include operations, features, means, or instructions for powering the control interface for a first time duration based on the one or more measured energy levels exceeding the power threshold.

Some examples of the method, apparatuses, and non-transitory computer-readable medium described herein may further include operations, features, means, or instructions for monitoring a control channel using the control interface for the first time duration based on powering on the control interface, receiving, from the base station, control information prior to expiration of the first time duration based on the monitoring of the control channel, where the control information includes one or more commands for the control interface, and configuring the control interface based on the one or more commands.

Some examples of the method, apparatuses, and non-transitory computer-readable medium described herein may further include operations, features, means, or instructions for monitoring a control channel using the control interface for the first time duration based on powering on the control interface, and powering off the control interface upon expiration of the first time duration.

In some examples of the method, apparatuses, and non-transitory computer-readable medium described herein, configuring the control interface may include operations, features, means, or instructions for powering the control interface for a first time duration based on the one or more measured energy levels matching the power profile.

Some examples of the method, apparatuses, and non-transitory computer-readable medium described herein may further include operations, features, means, or instructions for monitoring a control channel using the control interface for the first time duration based on powering on the control interface, receiving, from the base station, control information prior to expiration of the first time duration based on the monitoring of the control channel, where the control information includes one or more commands for the control interface, and configuring the control interface based on the one or more commands.

Some examples of the method, apparatuses, and non-transitory computer-readable medium described herein may further include operations, features, means, or instructions for monitoring a control channel using the control interface for the first time duration based on powering on the control interface, and powering off the control interface upon expiration of the first time duration.

Some examples of the method, apparatuses, and non-transitory computer-readable medium described herein may further include operations, features, means, or instructions for determining a ratio between a first measured energy level of the one or more measured energy levels and a second measured energy level of the one or more measured energy levels, where the first measured energy level includes a first average power level of a first set of symbols of the periodic signal and the second measured energy level includes a second average power level of a second set of symbols of the periodic signal, and determining the one or more measured energy levels match the power profile based on the ratio.

In some examples of the method, apparatuses, and non-transitory computer-readable medium described herein, comparing the one or more measured energy levels to the power threshold information may include operations, features, means, or instructions for comparing the ratio to the power profile.

In some examples of the method, apparatuses, and non-transitory computer-readable medium described herein, the power profile includes a pattern of power variation across the first set of symbols of the periodic signal and the second set of symbols of the periodic signal.

In some examples of the method, apparatuses, and non-transitory computer-readable medium described herein, configuring the control interface may include operations, features, means, or instructions for transitioning to a low power state based on the one or more measured energy levels being less than the power threshold.

In some examples of the method, apparatuses, and non-transitory computer-readable medium described herein, configuring the control interface may include operations, features, means, or instructions for transitioning to a low power state based on the one or more measured energy levels being different than the power profile.

In some examples of the method, apparatuses, and non-transitory computer-readable medium described herein, the power threshold for the one or more measured energy levels includes a constant power envelope for the configured time period. In some examples of the method, apparatuses, and non-transitory computer-readable medium described herein, the power profile for the configured time period includes an energy-time-variation pattern across the configured time period.

In some examples of the method, apparatuses, and non-transitory computer-readable medium described herein, measuring the one or more energy levels associated with the received periodic signal across the configured time period may include operations, features, means, or instructions for measuring a first average energy level of the received periodic signal across a first symbol of the configured time period, and measuring a second average energy level of the received periodic signal across one or more remaining symbols of the configured time period.

In some examples of the method, apparatuses, and non-transitory computer-readable medium described herein, configuring the control interface may include operations, features, means, or instructions for powering the control interface for a first time duration or transitioning to a low power state based on a difference between the first average energy level and the second average energy level.

In some examples of the method, apparatuses, and non-transitory computer-readable medium described herein, the power threshold information includes the difference. Some examples of the method, apparatuses, and non-transitory computer-readable medium described herein may further include operations, features, means, or instructions for performing an amplification operation on the received periodic signal, and transmitting the amplified periodic signal to a UE. In some examples of the method, apparatuses, and non-transitory computer-readable medium described herein, the periodic signal includes a synchronization signal block and the configured time period includes four symbols of the synchronization signal block.

A method of wireless communications at a base station is described. The method may include transmitting a control interface triggering configuration to a wireless repeater, where the control interface triggering configuration includes power threshold information for powering of a control interface of the wireless repeater, determining one or more transmission power levels for a periodic signal over a configured time period based on a configuration of the wireless repeater and the control interface triggering configuration, and transmitting the periodic signal during the configured time period based on the one or more determined transmission power levels.

An apparatus for wireless communications at a base station is described. The apparatus may include a processor and memory coupled with the processor. The processor and memory may be configured to transmit a control interface triggering configuration to a wireless repeater, where the control interface triggering configuration includes power threshold information for powering of a control interface of the wireless repeater. The processor and memory may be configured to determine one or more transmission power levels for a periodic signal over a configured time period based on a configuration of the wireless repeater and the control interface triggering configuration and transmit the periodic signal during the configured time period based on the one or more determined transmission power levels.

Another apparatus for wireless communications at a base station is described. The apparatus may include means for transmitting a control interface triggering configuration to a wireless repeater, where the control interface triggering configuration includes power threshold information for powering of a control interface of the wireless repeater, determining one or more transmission power levels for a periodic signal over a configured time period based on a configuration of the wireless repeater and the control interface triggering configuration, and transmitting the periodic signal during the configured time period based on the one or more determined transmission power levels.

A non-transitory computer-readable medium storing code for wireless communications at a base station is described.

The code may include instructions executable by a processor to transmit a control interface triggering configuration to a wireless repeater, where the control interface triggering configuration includes power threshold information for powering of a control interface of the wireless repeater. The code may also include instructions executable by the processor to determine one or more transmission power levels for a periodic signal over a configured time period based on a configuration of the wireless repeater and the control interface triggering configuration and transmit the periodic signal during the configured time period based on the one or more determined transmission power levels.

Some examples of the method, apparatuses, and non-transitory computer-readable medium described herein may further include operations, features, means, or instructions for determining whether to send new control information to the wireless repeater based on the configuration of the wireless repeater, and determining whether to trigger powering of the control interface of the wireless repeater based on the determination of whether to send the new control information to the wireless repeater.

In some examples of the method, apparatuses, and non-transitory computer-readable medium described herein, the one or more transmission power levels for the periodic signal over the configured time period may be determined based on the determination of whether to trigger powering of the control interface of the wireless repeater and the power threshold information.

Some examples of the method, apparatuses, and non-transitory computer-readable medium described herein may further include operations, features, means, or instructions for determining new control information for the wireless repeater and determining to trigger powering of the control interface of the wireless repeater based on the new control information, where at least one of the one or more transmission power levels may be determined based on the determination to trigger powering of the control interface of the wireless repeater, and boosting the at least one of the one or more transmission power levels for the periodic signal.

In some examples of the method, apparatuses, and non-transitory computer-readable medium described herein, boosting the at least one of the one or more transmission power levels may include operations, features, means, or instructions for boosting the at least one of the one or more transmission power levels by a difference compared to a remainder of the one or more transmission power levels, where the power threshold information includes the difference.

In some examples of the method, apparatuses, and non-transitory computer-readable medium described herein, the boosting may be based on the power threshold information. In some examples of the method, apparatuses, and non-transitory computer-readable medium described herein, the power threshold information includes a power threshold for the one or more transmission power levels, a power profile for the configured time period, or both.

In some examples of the method, apparatuses, and non-transitory computer-readable medium described herein, the power threshold for the one or more transmission power levels includes a constant power envelope for the configured time period. In some examples of the method, apparatuses, and non-transitory computer-readable medium described herein, the power profile for the configured time period includes an energy-time-variation pattern across the configured time period.

Some examples of the method, apparatuses, and non-transitory computer-readable medium described herein may further include operations, features, means, or instructions for transmitting the new control information to the wireless repeater prior to expiration of a first time duration, where the control interface triggering configuration indicates the first time duration. In some examples of the method, apparatuses, and non-transitory computer-readable medium described herein, the periodic signal includes a synchronization signal block and the configured time period includes four symbols of the synchronization signal block.

A method of wireless communications at a wireless device in a wireless network is described. The method may include receiving a control interface triggering configuration from a base station, wherein the control interface triggering configuration comprises power threshold information for powering of a control interface of the wireless device and receiving, from the base station, a periodic signal during a configured time period. The method may also include measuring one or more energy levels associated with the received periodic signal across the configured time period based at least in part on the received control interface triggering configuration and configuring the control interface based at least in part on the one or more measured energy levels and the control interface triggering configuration.

An apparatus for wireless communications at a wireless device in a wireless network is described. The apparatus may include a processor and memory coupled with the processor. The processor and memory may be configured to receive a control interface triggering configuration from a base station, wherein the control interface triggering configuration comprises power threshold information for powering of a control interface of the wireless device and receive, from the base station, a periodic signal during a configured time period. The processor and memory may be configured to measure one or more energy levels associated with the received periodic signal across the configured time period based at least in part on the received control interface triggering configuration and configure the control interface based at least in part on the one or more measured energy levels and the control interface triggering configuration.

Another apparatus for wireless communications at a wireless device in a wireless network is described. The apparatus may include means for receiving a control interface triggering configuration from a base station, wherein the control interface triggering configuration comprises power threshold information for powering of a control interface of the wireless device and receiving, from the base station, a periodic signal during a configured time period. The apparatus may also include means for measuring one or more energy levels associated with the received periodic signal across the configured time period based at least in part on the received control interface triggering configuration and configuring the control interface based at least in part on the one or more measured energy levels and the control interface triggering configuration.

A non-transitory computer-readable medium storing code for wireless communications at a wireless device in a wireless network is described. The code may include instructions executable by a processor to receiving a control interface triggering configuration from a base station, wherein the control interface triggering configuration comprises power threshold information for powering of a control interface of the wireless device and receiving, from the base station, a periodic signal during a configured time period. The code may also include instructions executable by the processor to measure one or more energy levels associated with the received periodic signal across the configured time period based at least in part on the received control interface triggering configuration and configure the control interface based at least in part on the one or more measured energy levels and the control interface triggering configuration.

Some examples of the method, apparatuses, and non-transitory computer-readable medium described herein may further include operations, features, means, or instructions for comparing the one or more measured energy levels to the power threshold information, wherein the power threshold information comprises a power threshold for the one or more measured energy levels, a power profile for the configured time period, or both.

Some examples of measuring the one or more energy levels associated with the received periodic signal across the configured time period comprising described herein may further include operations, features, means, or instructions for measuring a first average energy level of the received periodic signal across a first symbol of the configured time period and measuring a second average energy level of the received periodic signal across one or more remaining symbols of the configured time period.

DETAILED DESCRIPTION

Figure 1:
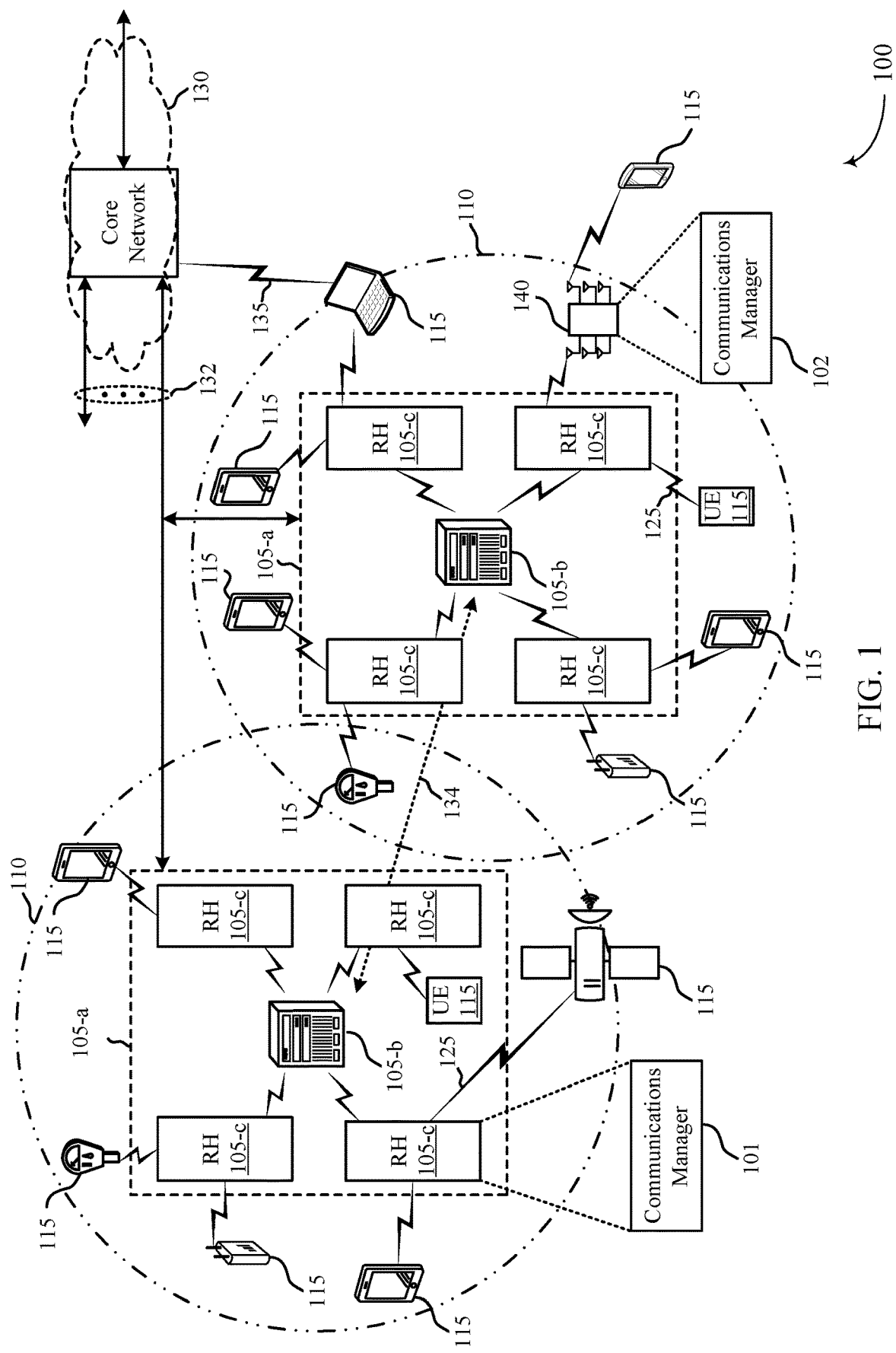
FIG. 1 illustrates an example of a system for wireless communications that supports power saving of smart repeaters based on a triggering signal in accordance with one or more aspects of the present disclosure.

In some wireless communications systems, a base station may communicate with a UE over a wireless link. For instance, base stations and UEs may operate in millimeter wave (mmW) frequency ranges (e.g., 28 gigahertz (GHz), 40 GHz, 60 GHz, etc.). Wireless communications at these frequencies may be associated with increased signal attenuation (e.g., pathloss), which may be influenced by various factors, such as temperature, barometric pressure, diffraction, blockage, or the like. As a result, signal processing techniques such as beamforming may be used to coherently combine energy and reduce some of the pathloss at these frequencies. However, the transmission of a signal (such as a beamformed signal) between the base station and the UE may not be possible or the transmission may be interfered with due to a physical barrier or a radio frequency (RF) jammer. In these cases, a repeating device (e.g., a wireless repeater, a smart repeater, a mmW repeater, a wireless relay device, etc.) may be used to repeat and/or relay the transmission from the base station to the UE, and vice versa, thereby enabling efficient communication in the presence of physical barriers, RF jammers, or other causes of obstruction or interference. In some examples, a repeating device such as a smart repeater may be capable of advanced operation features as described herein.

A wireless repeater may repeat, extend, or redirect wireless signals received from a base station to a UE, from the UE to the base station, or between other wireless devices. For example, the wireless repeater may receive a signal from a base station and retransmit the signal to a UE or receive a signal from a UE and retransmit the signal to the base station. In some examples, a wireless repeater may amplify and forward (e.g., amplify and transmit) signals transmitted between wireless devices. In cases where transmissions from the base station to the UE (and vice versa) are blocked due to physical barriers or are associated with pathloss influenced by various factors (e.g., such as distance between the base station and UE, temperature, barometric pressure, diffraction, blockage, etc.), a wireless repeater may receive signals transmitted between wireless devices, amplify the received signals, and forward (e.g., transmit) the amplified signals to facilitate efficient communications between the wireless devices.

Additionally, in some cases, various phase rotations may be applied to signals transmitted between wireless devices, where, for example, a base station may transmit a signal on a first carrier frequency and with a phase rotation (e.g., a pre-rotation). In cases where transmissions from the base station to the UE (and vice versa) are blocked due to an RF jammer, the RF jammer may corrupt certain frequencies, and those frequencies (such as the frequency used for transmission by the base station) may therefore not be reliable for transmission. As such, a wireless repeater may be used to transmit (or retransmit) the signal after amplifying it or performing a frequency translation (e.g., heterodyning) of a first carrier frequency to a second carrier frequency, etc. For example, the second carrier frequency may be different from the frequency that was used to transmit the signal to the wireless repeater, and the new frequency may be unaffected by interference from the RF jammer.

Accordingly, the wireless repeater may be configured to perform relay operations (e.g., wireless repeater operations, such as signal amplification, signal phase rotation, signal forwarding, etc.) to reduce or minimize path loss or interference in various environments. In some cases, the wireless repeater may be configured via base station control signaling. For example, a base station may control parameters for wireless repeater forwarding such as amplification, direction, frequency gains, frequency translation, or the like. As such, a wireless repeater may monitor a control channel (e.g., a physical downlink control channel (PDCCH)) for control information from the base station in order to configure and perform relay (e.g., amplification and forwarding) duties. However, in some cases, diligent monitoring for control information (e.g., monitoring of every slot of a control channel) may be associated with high power consumption at the wireless repeater. Further, in cases where a UE is not attached to the wireless repeater or base station, or where an attached UE is powered off or is not actively communicating with the base station, etc., such monitoring for control information may be inefficient, as relay duties may be less likely to be configured or may be less frequently configured in such cases.

The described techniques relate to improved methods, systems, devices, and apparatuses that support power saving of smart repeaters (e.g., which may be referred to as wireless repeaters, repeaters, mmW repeaters, etc.). The described techniques may provide for a wireless device (e.g., wireless repeater, wireless relay device, smart repeater, etc.) to operate in a low power state and base station signaling for triggering of wireless repeater control interface configuration. For example, a wireless repeater may operate in a power saving mode and monitor for control information from a base station according to a low power state or a slow state (e.g., according to a long monitoring periodicity relative to a monitoring periodicity associated with a full power state or fast state). Upon detection of triggering signal from a base station, the wireless repeater may transition to monitoring for control information from the base station according to a fast state (e.g., according to a short, or more frequent, monitoring periodicity relative to a monitoring periodicity associated with a low power state).

For example, a base station may trigger some wireless repeater configuration (e.g., some configuration of a control interface of the wireless repeater) via setting transmission power levels for some periodic signal monitored by the wireless repeater. The base station may indicate a control interface triggering configuration to the wireless repeater, where the control interface triggering configuration may include power threshold information for powering of a control interface of the wireless repeater. For example, a control interface triggering configuration may include power threshold information such as a power threshold (e.g., a constant power envelope for a configured periodic signal), a power profile (e.g., an energy-time-variation pattern across a configured periodic signal), etc. As such, a wireless repeater may measure one or more energy levels associated with a configured periodic signal (e.g., a signal that the wireless repeater is configured to relay), and the wireless repeater may compare the measured one or more energy levels to power threshold information indicated by the control interface triggering configuration to configure the control interface of the wireless repeater.

In some cases, a base station may base a control interface triggering configuration off of a periodic signal, such as a synchronization signal block (SSB). A wireless repeater may be configured to periodically monitor for (e.g., and forward to a UE) SSBs in configured time periods associated with SSB transmissions from the base station. The wireless repeater may thus operate in a low power state, and monitor for control information infrequently or not at all until a triggering signal (e.g., an SSB associated with one or more measured energy levels that trigger powering of the control interface) is received. As such, a base station may configure or trigger wireless repeater control channel monitoring via setting transmission power levels across one or more symbols of an SSB, such that when the wireless repeater measures one or more energy levels associated with the triggering SSB, the wireless repeater may configure the control interface of the wireless repeater in accordance with the control interface triggering configuration.

A base station may establish a control interface triggering configuration for various wireless repeater states. For example, in some cases, a control interface triggering configuration may be established to transition a wireless repeater from a low power state to an active state (e.g., a control interface triggering configuration may be established to power on a control interface of the wireless repeater). A control interface triggering configuration may be established to configure any state of the wireless repeater (e.g., a control interface triggering configuration may be established to power down a control interface of the wireless repeater, to modify a control channel monitoring periodicity by the control interface of the wireless repeater to some monitoring periodicity indicated by the control interface triggering configuration, etc.).

A triggering signal may thus refer to any periodic signal transmitted by a base station according to one or more power levels to trigger some configuration (e.g., control interface configuration) of the wireless repeater, based on some associated control interface triggering configuration. According to some examples, a triggering signal may refer to an SSB, where the base station may transmit the SSB with some boosted power level, some power variation across portions (e.g., symbols) of the SSB, etc. As such, when a wireless repeater measures one or more energy levels across a configured time period associated with the SSB, the wireless repeater may compare the one or more measured energy levels to a power threshold for the one or more measured energy levels, a power profile for the configured time period, etc. (e.g., in accordance with a control interface triggering configuration). The wireless repeater may then configure a control interface (e.g., power on a control interface, transition the control interface to a more frequent control channel monitoring pattern, power off the control interface, transition the control interface to a less frequent control channel monitoring pattern, etc.) based on the comparison (e.g., based on whether the SSB is indeed a triggering signal in accordance with the control interface triggering configuration).

A base station may further transmit control commands (e.g., fast commands configuring more frequent control channel monitoring by the wireless repeater, slow commands configuring less frequent control channel monitoring by the wireless repeater, etc.) via the control channel to modify the monitoring configuration of the wireless repeater. For example, upon detection triggering signal, a wireless repeater may transition to a tentative fast state, and may monitor a control channel according to the tentative fast state for control commands from the base station. If no control commands are received from the base station (e.g., prior to expiration of some first time duration associated with the control interface triggering configuration), the wireless repeater may transition back to a slow state (e.g., and monitor the control channel less frequently, according to the slow state).

Aspects of the disclosure are initially described in the context of a wireless communications system. An example transmission power diagram and an example process flow for implementation of one or more aspects of the discussed techniques are then described. Aspects of the disclosure are further illustrated by and described with reference to apparatus diagrams, system diagrams, and flowcharts that relate to power saving of smart repeaters based on a triggering signal.

FIG. 1 illustrates an example of a wireless communications system 100 that supports power saving of smart repeaters in accordance with one or more aspects of the present disclosure. The wireless communications system 100 includes network devices 105, UEs 115, and a core network 130. In some examples, the wireless communications system 100 may be a LTE network, a LTE-A network, a LTE-A Pro network, or a NR network. In some cases, wireless communications system 100 may support enhanced broadband communications, ultra-reliable (e.g., mission critical) communications, low latency communications, or communications with low-cost and low-complexity devices. Wireless communications system 100 may support signaling between network devices 105, repeaters 140, and UEs 115 for configuration and management of repeater 140 control channel monitoring.

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by network devices 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices 105 (e.g., network device 105-a), which may be an example of a base station (e.g., eNB, network access devices, gNB), or network device 105-b, which may be an example of an access node controller (ANC)), may interface with the core network 130 through backhaul links 132 (e.g., S1, S2) and may perform radio configuration and scheduling for communication with the UEs 115. In various examples, the network devices 105-b may communicate, either directly or indirectly (e.g., through core network 130), with each other over backhaul links 134 (e.g., X1, X2), which may be wired or wireless communication links.

Each network device 105-b may also additionally or alternatively communicate with a number of UEs 115 through a number of other network devices 105-c, where network device 105-c may be an example of a smart radio head (or through a number of smart radio heads). In alternative configurations, various functions of each network device 105 may be distributed across various network devices 105 (e.g., radio heads and access network controllers) or consolidated into a single network device 105 (e.g., a base station).

Network devices 105 may wirelessly communicate with UEs 115 via one or more base station antennas. Network device 105 described herein may include or may be referred to by those skilled in the art as a base transceiver station, a radio base station, an access point, a radio transceiver, a NodeB, an eNB, a next-generation Node B or giga-nodeB (either of which may be referred to as a gNB), a Home NodeB, a Home eNodeB, or some other suitable terminology. Wireless communications system 100 may include network devices 105 of different types (e.g., macro or small cell base stations). The UEs 115 described herein may be able to communicate with various types of network devices 105 and network equipment including macro eNBs, small cell eNBs, gNBs, relay base stations, and the like. In some examples, a network device 105 may wirelessly communicate with one or more repeaters 140 (e.g., repeating devices, wireless repeaters) that may support the retransmission, amplification, frequency translation, etc. of signaling to one or more other devices, such as a UE 115. Similarly, a repeater 140 may be used to retransmit or forward signaling from a UE 115 to a network device 105.

Each network device 105 may be associated with a particular geographic coverage area 110 in which communications with various UEs 115 is supported. Each network device 105 may provide communication coverage for a respective geographic coverage area 110 via communication links 125, and communication links 125 between a network device 105 and a UE 115 may utilize one or more carriers. Communication links 125 shown in wireless communications system 100 may include uplink transmissions from a UE 115 to a network device 105, or downlink transmissions from a network device 105 to a UE 115. Downlink transmissions may also be called forward link transmissions while uplink transmissions may also be called reverse link transmissions.

The geographic coverage area 110 for a network device 105 may be divided into sectors making up only a portion of the geographic coverage area 110, and each sector may be associated with a cell. For example, each network device 105 may provide communication coverage for a macro cell, a small cell, a hot spot, or other types of cells, or various combinations thereof. In some examples, a network device 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same network device 105 or by different network devices 105. The wireless communications system 100 may include, for example, a heterogeneous LTE/LTE-A/LTE-A Pro or NR network in which different types of network devices 105 provide coverage for various geographic coverage areas 110.

The term "cell" refers to a logical communication entity used for communication with a network device 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like. A UE 115 may communicate with the core network 130 through communication link 135.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a network device 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging. In some cases, a repeater 140 may be a MTC or IoT device that is controlled by a network device 105 or UE 115 via a low bandwidth (low-band) or NB-IoT connection and performs repeating of received signals without demodulation or decoding of such signals based on control information provided by the low-band or NB-IoT connection.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving "deep sleep" mode when unengaged in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a network device 105. Other UEs 115 in such a group may be outside the geographic coverage area 110 of a network device 105, or be otherwise unable to receive transmissions from a network device 105. In some cases, groups of UEs 115 communicating via D2D communications may utilize a one-to-many (1:M) system in which each UE 115 transmits to every other UE 115 in the group. In some cases, a network device 105 facilitates the scheduling of resources for D2D communications. In other cases, D2D communications are carried out between UEs 115 without the involvement of a network device 105.

Network devices 105 may communicate with the core network 130 and with one another. For example, network devices 105 may interface with the core network 130 through backhaul links 132 (e.g., via an S1, N2, N3, or other interface). Network devices 105 may communicate with one another over backhaul links 134 (e.g., via an X2, Xn, or other interface) either directly (e.g., directly between network devices 105) or indirectly (e.g., via core network 130).

At least some of the network devices, such as a network device 105, may include subcomponents such as an access network entity, which may be an example of an ANC. Each access network entity may communicate with UEs 115 through a number of other access network transmission entities, which may be referred to as a radio head, a smart radio head, or a transmission/reception point (TRP). In some configurations, various functions of each access network entity or network device 105 may be distributed across various network devices (e.g., radio heads and access network controllers) or consolidated into a single network device (e.g., a network device 105).

Wireless communications system 100 may operate using one or more frequency bands, typically in the range of 300 MHz to 300 GHz. The region from 300 MHz to 3 GHz may be known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support mmW communications between UEs 115 and network devices 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as network devices 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, network device 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a network device 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a network device 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a network device 105 may use multiple antennas or antenna arrays to conduct beamforming operations for directional communications with a UE 115. For instance, some signals (e.g. synchronization signals, reference signals, beam selection signals, or other control signals) may be transmitted by a network device 105 multiple times in different directions, which may include a signal being transmitted according to different beamforming weight sets associated with different directions of transmission. Transmissions in different beam directions may be used to identify (e.g., by the network device 105 or a receiving device, such as a UE 115) a beam direction for subsequent transmission and/or reception by the network device 105. Some signals, such as data signals associated with a particular receiving device, may be transmitted by a network device 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the network device 105 in different directions, and the UE 115 may report to the network device 105 an indication of the signal it received with a highest signal quality, or an otherwise acceptable signal quality. Although these techniques are described with reference to signals transmitted in one or more directions by a network device 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the network device 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a network device 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a network device 105 may be located in diverse geographic locations. A network device 105 may have an antenna array with a number of rows and columns of antenna ports that the network device 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the radio resource control (RRC) protocol layer may provide establishment, configuration, and maintenance of an RRC connection between a UE 115 and a network device 105 or core network 130 supporting radio bearers for user plane data. At the Physical (PHY) layer, transport channels may be mapped to physical channels.

In some cases, UEs 115 and network devices 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s = 1/30,720,000$ seconds. Time intervals of a communications resource may be organized according to radio frames each having a duration of 10 milliseconds (ms), where the frame period may be expressed as $T_f = 307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a network device 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related.

The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., network devices 105 or UEs 115) may have a hardware configuration that supports communications over a particular carrier bandwidth, or may be configurable to support communications over one of a set of carrier bandwidths. In some examples, the wireless communications system 100 may include network devices 105 and/or UEs 115 that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are incapable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or network device 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

A UE 115 attempting to access a wireless network may perform an initial cell search by detecting a primary synchronization signal (PSS) from a network device 105. The PSS may enable synchronization of slot timing and may indicate a physical layer identity value. The UE 115 may then receive a secondary synchronization signal (SSS). The SSS may enable radio frame synchronization, and may provide a cell identity value, which may be combined with the physical layer identity value to identify the cell. The SSS may also enable detection of a duplexing mode and a cyclic prefix length. Some systems, such as TDD systems, may transmit an SSS but not a PSS. Both the PSS and the SSS may be located in the central 62 and 72 subcarriers of a carrier, respectively. In some cases, a network device 105 may transmit synchronization signals (e.g., PSS SSS, and the like) using multiple beams in a beam-sweeping manner through a cell coverage area. In some cases, PSS, SSS, and/or broadcast information (e.g., a physical broadcast channel (PBCH)) may be transmitted within a SSB on respective directional beams, where one or more SSBs may be included within a synchronization signal burst.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the EHF band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

Wireless communications system 100 may include one or more repeaters 140 (e.g., wireless repeaters 140). Wireless repeaters 140 may include functionality to repeat, extend, and redirect wireless signals transmitted within a wireless communications system. In some cases, wireless repeaters 140 may be used in line-of-sight (LOS) or non-line of sight (NLOS) scenarios. In a LOS scenario, directional (e.g., beamformed) transmissions, such as mmW transmissions, may be limited by path-loss through air. In a NLOS scenario, such as in an urban area or indoors, mmW transmissions may be limited by signal blocking or signal interfering physical objects. In either scenario, a wireless repeater 140 may be used to receive a signal from a network device 105 (e.g., a base station) and transmit a signal to UE 115, or receive a signal from a UE 115 and transmit the signal to the network device 105. Beamforming, filtering, gain control, and phase correction techniques may be utilized by the wireless repeater 140 to improve signal quality and avoid RF interference with the transmitted signal. Phase rotation adjustment may be applied by the wireless repeater 140 to the signal to correct for phase rotation error caused by the frequency translation by the repeater 140.

In some cases, a wireless repeater 140 may include an array of reception antennas and an array of transmission antennas. In some cases, the wireless repeater 140 may include digital filtering, and the wireless repeater 140 may include a signal processing chain connected (e.g., coupled, linked, attached) between the array of reception of antennas and the array of transmission antennas. The signal processing chain may be implemented as an RF integrated circuit (RFIC), which may include RF/microwave components such as one or more phase shifters, low noise amplifiers (LNAs), power amplifiers (PAs), PA drivers, heterodyning mixers, carrier tracking circuits, gain controllers, power detectors, filters, or other circuitry, in conjunction with a digital component that may include one or more of digital filters, processors, analog-to-digital (A/D) converters, digital-to-analog (D/A) converters, or other circuitry. The phase shifters may be controlled by one or more beam controllers for beamforming to reduce signal interference. The heterodyning mixers may downconvert a frequency of a received signal to an intermediate frequency (IF) or baseband frequency, that may be filtered by the one or more filters, and the heterodyning mixers may upconvert the filtered signal back to the higher frequency. The signal processing chain may include a feedback path for monitoring the output of one or more PAs, and adjusting gains to one or more PA drivers to the PAs and gains to one or more LNAs based on the output. The gain adjustment may function to stabilize the signal reception and transmission and improve signal quality between devices such as network device 105 and UE 115. Accordingly, through beamforming, filtering, and gain control, signal quality (e.g., mmW signals) may be improved in LOS and NLOS scenarios.

As described, the wireless repeater 140 may include components (e.g., antenna arrays and signal processing chain circuitry) in the analog/RF domain, as well as one or more digital filters, or both analog and digital filters. Further, in some cases the wireless repeater 140 may include digital circuitry for receiving control information (e.g., for receiving remote configuration of gain, direction, and local oscillator tracking via sub-6 or via mmW signals). In some cases where the control information is not received via the mmW signals, the control information may be received using a different radio access technology than used between the network device 105 and UE 115. For example, one or more side channels may be used to provide control information and implemented as Bluetooth, ultra-wide band, wireless LAN, etc. protocols, and as such, the repeater 140 may include circuitry and/or processors for receiving and processing signals received via those protocols and controlling beamforming at the RF components based on those signals received at the side channel.

As such, in general, a repeater 140 may be configured to receive in-band control information or out of band control information. In-band control information may refer to control channel monitoring (e.g., and control information reception) within the same band or within the same frequency channel as configured forwarding operations. For example, monitoring for in-band control information may refer to monitoring for control information in the same band or frequency channel as the band or frequency channel in which the repeater 140 is configured to monitor and forward communications (e.g., such as periodic signals) between a network device 105 and UE 115. Out of band control information may refer to control information received in a different band or a different frequency channel than configured forwarding operations. For example, monitoring for out of band control information may refer to monitoring for control information in the a different band or frequency channel (e.g., such as a sub-6 GHz channel) than a band or frequency channel (e.g., such as a mmW channel) in which the repeater 140 is configured to monitor and forward communications between a network device 105 and UE 115. The techniques described herein may provide for repeater 140 measuring of one or more energy levels across a configured time period, and potential triggering of monitoring for in-band or out of band control information based on the one or more energy measurements and a triggering configuration (e.g., a control interface triggering configuration).

In some aspects, a repeater 140 may refer to a mmW repeater 140 and may receive an analog mmW signal from a network device 105, may amplify the analog mmW signal, and may transmit the amplified mmW signal to one or more UEs 115. In some aspects, the mmW repeater 140 may be an analog mmW repeater, sometimes also referred to as a layer-1 mmW repeater 140. Additionally, or alternatively, the repeater 140 may be a wireless TRP acting as a distributed unit (e.g., of a 5G access node) that communicates wirelessly with a network device 105 acting as a central unit or an access node controller (e.g., of the 5G access node). In some examples, the repeater 140 may receive, amplify, and transmit the analog mmW signal without performing analog-to-digital conversion of the analog mmW signal and/or without performing any digital signal processing on the mmW signal. In this way, latency may be reduced and a cost to produce the repeater 140 may be reduced. Additional details regarding repeater 140 are provided elsewhere herein.

One or more of the network devices 105 may include a communications manager 101, which may transmit a control interface triggering configuration to a repeater 140, where the control interface triggering configuration includes power threshold information for powering of a control interface of the repeater 140, determine one or more transmission power levels for a periodic signal over a configured time period based on a configuration of the repeater 140 and the control interface triggering configuration, and transmit the periodic signal during the configured time period based on the one or more determined transmission power levels.

Repeaters 140 may include a communications manager 102, which may receive a control interface triggering configuration from a network device 105, where the control interface triggering configuration includes power threshold information for powering of a control interface of the repeater 140. The communications manager 102 may receive, from the network device 105, a periodic signal during a configured time period, and measure one or more energy levels associated with the received periodic signal across the configured time period based on the received control interface triggering configuration. The communications manager 102 may then configure the control interface based on the one or more measured energy levels and the control interface triggering configuration.

Figure 2:
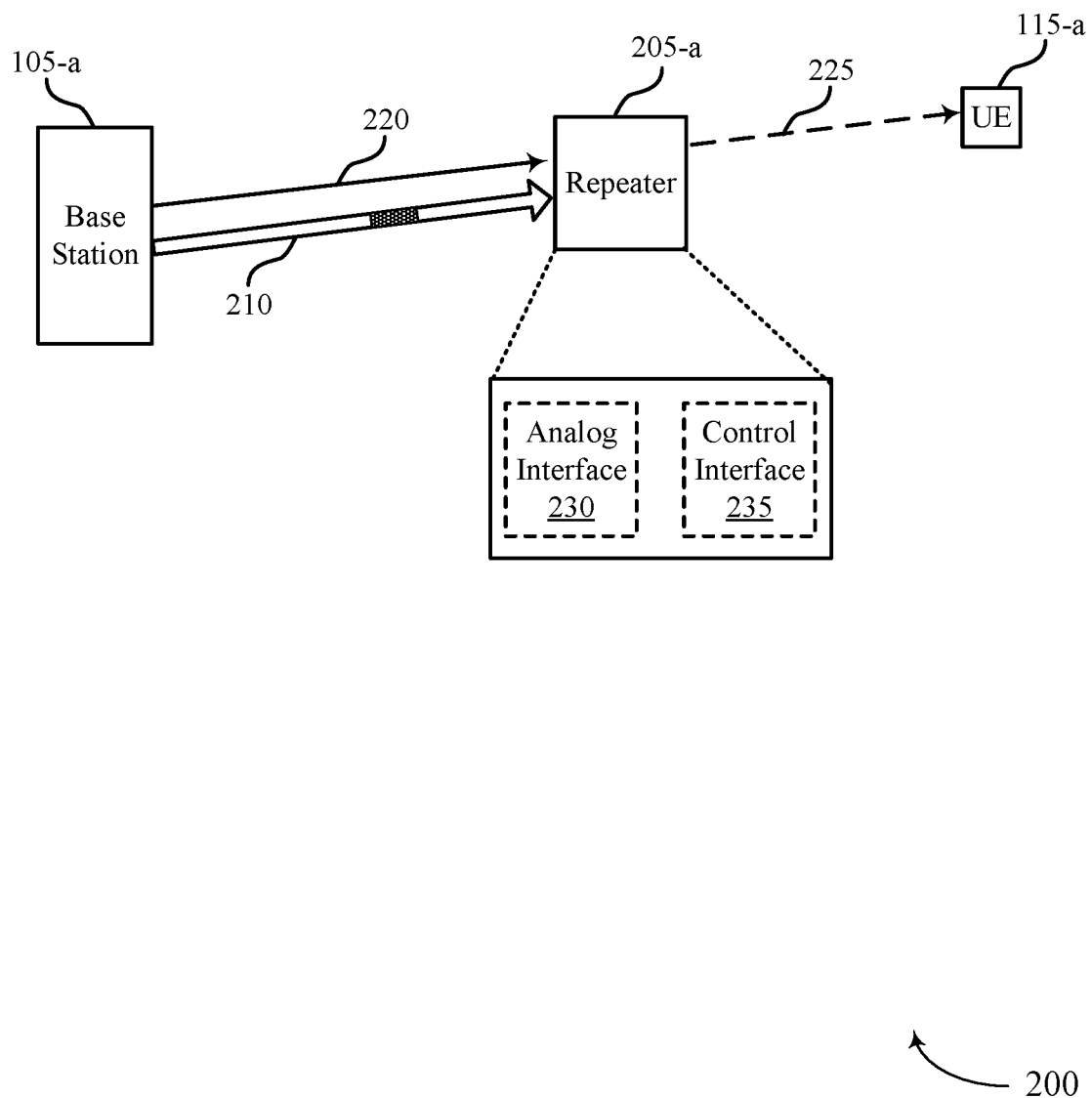
FIG. 2 illustrates an example of a wireless communications system that supports power saving of smart repeaters based on a triggering signal in accordance with one or more aspects of the present disclosure.

FIG. 2 illustrates an example of a wireless communications system 200 that supports power saving of smart repeaters based on a triggering signal in accordance with one or more aspects of the present disclosure. In some examples, wireless communications system 200 may implement aspects of wireless communications system 100. For instance, wireless communications system 200 may include a base station 105-a and a UE 115-a, which may be examples of a network device 105 and UE 115 as described with reference to FIG. 1. Base station 105-a may communicate with one or more UEs 115. In some cases, communications may be relayed from base station 105-a to UEs 115 (and vice versa) by one or more repeaters 205 (e.g., wireless repeaters), such as repeater 205-*a* which may be an example of a repeater 140 described with reference to FIG. 1. In the example of FIG. 2, repeater 205-*a* may monitor a downlink control channel 210 for control information 215 sent by base station 105-*a*. Further, repeater 205-*a* may monitor configured slots (e.g., SSB slots) for periodic signals 220 (e.g., such as an SSB) that may be sent by base station 105-*a*. In some cases, repeater 205-*a* may be configured to forward the signal 220 (e.g., to transmit a forwarded signal 225 to UE 115-*a*).

As discussed herein, repeaters 205 may relay signals between a base station 105 and UEs 115 to avoid or reduce blockage or interference. For example, in some cases, there may be an object blocking a signal being transmitted from the base station 105-*a* to the UE 115-*a*, or vice versa. The object may be a physical object or, in some cases, may be a frequency jammer, such as an RF jammer. Physical objects that may block transmitted signals may include hills, mountains, buildings, walls, other infrastructure, etc. A RF jammer may function by targeting, interfering with, blocking, or jamming, certain frequencies that transmissions are sent on. As an example, an RF jammer may include another wireless device (e.g., other base stations 105, UEs 115, etc.), other types of transmissions or signals (e.g., radar, satellite, etc.), or the like. RF jammers may include RF jammers that affect transmissions through adjacent channel selectivity (ACS) jamming, in-band blocking (IBB), and out-of-band (OOB) jamming.

In the example of FIG. 2, repeater 205-*a* may repeat, extend, or redirect wireless signals received from base station 105-*a* to UE 115-*a*, from UE 115-*a* to base station 105-*a*, or between other wireless devices. For example, the repeater 205-*a* may receive a signal from base station 105-*a* and retransmit the signal to a UE 115-*a*, or receive a signal from UE 115-*a* and retransmit the signal to base station 105-*a*. In some examples, repeater 205-*a* may amplify and forward (e.g., amplify and transmit) signals transmitted between base station 105-*a* and UE 115-*a*. In cases where transmissions from base station 105-*a* to UE 115-*a* (and vice versa) are blocked due to physical barriers or are associated with path loss influenced by various factors (e.g., such as distance between the base station and UE, temperature, barometric pressure, diffraction, blockage, etc.), repeater 205-*a* may receive signals transmitted between base station 105-*a* and UE 115-*a*, amplify received signals, and forward the amplified signals to facilitate efficient communications between base station 105-*a* and UE 115-*a*.

For example, to support communications between base station 105-*a* and UE 115-*a*, repeater 205-*a* may amplify and forward SSBs (e.g., to relay system information to UEs 115), as well as amplify and forward random access channel (RACH) messaging (e.g., to facilitate UE 115 random access procedures). As such, repeater 205-*a* may facilitate UE 115-*a* attachment (e.g., connection) to base station 105-*a* (e.g., via relay of system information and random access messaging). Further, repeater 205-*a* may relay communications between base station 105-*a* and UE 115-*a* following UE 115-*a* attachment (e.g., communications over an establish connection between base station 105-*a* and UE 115-*a*).

As discussed herein, repeater 205-*a* may be configured to perform relay operations (e.g., wireless repeater operations, such as signal amplification, signal phase rotation, signal forwarding, etc.) to reduce or minimize path loss or interference for various communications in various environments. In some cases, the repeater may be configured via base station 105-*a* control signaling. For example, base station 105-*a* may control parameters of repeater 205-*a* forwarding such as amplification, direction, frequency gains, frequency translation, etc. for various communications (e.g., synchronization signaling, random access signaling, connected mode signaling, etc.) between base station 105-*a* and UE 115-*a*. As such, a repeater 205-*a* may monitor a control channel 210 (e.g., a PDCCH) for control information 215 from base station 105-*a* in order to perform (e.g., configure) relay duties (e.g., amplification and forwarding operations).

In some cases, wireless communications system 200 may support various techniques for SSB communication through repeater 205-*a*. For example, base station 105-*a* may initially beam sweep SSBs and the repeater 205-*a* may forward a SSB signal to UE 115-*a* (e.g., repeater 205-*a* may monitor for and receive signal 220, and may transmit forwarded signal 225 to UE 115-*a*). Further, according to the techniques described herein, wireless communications system 200 may support SSB based triggering of various repeater 205-*a* configuration (e.g., such as powering on and off of a control interface 235 of repeater 205-*a*).

Repeater 205-*a* may operate in a low power state to conserve power. In some cases, base station 105-*a* may want to wake up repeater 205-*a* (e.g., such that the repeater 205-*a* monitors a control channel 210, or monitors a control channel 210 more frequently, and is able to receive control information 215 from base station 105-*a*). In some cases, the base station may want to wake up repeater 205-*a* even if a UE 115-*a* is unattached. As such, base station 105-*a* may trigger repeater 205-*a* configuration (e.g., may trigger repeater 205-*a* powering of a control interface) based on periodic downlink signaling that the repeater is configured to monitor for (e.g., such as via transmission power boosting of signal 220). That is, a periodic signal 220 (e.g., SSBs) may be periodic in nature and may be transmitted by base station 105-*a* whether a UE 115-*a* is attached to the base station 105-*a* or not. Such signals may be used to trigger configuration of repeater 205-*a*, as discussed herein.

To enable direct control power saving (e.g., to enable repeater 205-*a* operation in a low power state, where control channel 210 may be infrequently monitored, or not monitored at all), base station 105-*a* may employ a triggering signal (e.g., in an SSB slot) in order to be able to transition the repeater 205-*a* out of the power saving state. That is, a base station 105-*a* may indicate a control interface triggering configuration to repeater 205-*a*, such that repeater 205-*a* may operate a control interface 235 in a low power state. In a low power state, repeater 205-*a* may still monitor for periodic signals 220 in configured slots (e.g., repeater 205-*a* may monitor for SSBs in configured SSB slots via analog interface 230, but may infrequently monitor control channel 210 or may not monitor control channel 210 in order to realize reduced power consumption). According to techniques described herein, repeater 205-*a* may measure one or more energy levels during configured monitoring slots (e.g., during SSB slots). The repeater 205-*a* may then compare the one or more measured energy levels to power threshold information of a control interface triggering configuration to determine whether to remain in a low power state (e.g., in cases where the one or more energy levels do not exceed a power threshold or match a power profile indicated by the control interface triggering configuration) or whether to power the control interface 235 to monitor control channel 210 (e.g., in cases where the one or more energy levels exceed the power threshold or match the power profile indicated by the control interface triggering configuration).

For example, a triggering signal (e.g., a periodic signal 220) may exhibit a distinct, pre-determined power profile from a normal or default SSB. As an example, a normal or default SSB may refer to an SSB with an almost constant power envelope in the SSB slot (e.g., where the constant power envelope may be set by the network, indicated to the repeater in an initial control interface triggering configuration, etc.). One option for configuration of a triggering signal is to use the same waveform as a normal SSB, but the SSB may be transmitted with a different power level (e.g., with a difference from a default SSB by a difference of, for example, at least 3 decibel (dB)). Another option for configuration of a triggering signal is that power may vary in the SSB slot according to some energy-time-variation pattern (e.g., where a triggering signal may be an SSB with time-varying energy according to some time-variation pattern or power profile indicated by a control interface triggering configuration). For example, the power of the first half of the SSB slot may be different from that of the second half of the SSB slot, where the power difference may be at least 3 dB.

Initially, a repeater 205-a may turn of control interface 235 or may monitor control channel 210 by operating control interface 235 in a slow rate or a power saving state (e.g., where the control channel is monitored according to a long monitoring periodicity relative to a full power state where the repeater 205-a is actively monitoring control channel 210). In such a low power state, the repeater 205-a may turn on SSB forwarding modules, as well as energy measurement modules, is a pre-determined set of time intervals (e.g., in SSB slots, or other time intervals configured for periodic signaling from base station 105-a). If the pre-determined power profile or power threshold over a default SSB power envelope is detected in an SSB slot, repeater 205-a may turn on control interface 235, and may monitor for additional control information 215 from base station 105-a. If no control information 215 is received from base station 105-a in a time duration the repeater 205-a is configured to power the control interface 235 after detection of a trigger SSB, repeater 205-a may turn off the control interface 235 (e.g., and transition back to a low power state and monitoring of preconfigured SSB slots).

Repeaters 205 may include various combinations of hardware (e.g., based on manufacturing cost considerations, repeater functionality considerations, etc.), and may employ one or several techniques for identification control interface 235 configuration. For example, a repeater 205 may include an analog interface 230 and a control interface 235. Analog interface 230 may refer to various components or circuitry for analog processing, as described in more detail herein. Similarly, control interface 235 may refer to various components or circuitry for digital processing, as described in more detail herein.

In some examples, repeater 205-a may include an analog interface 230, and therefore may receive signals 220, amplify signals 220, and transmit a forwarded signal 225 (e.g., an amplified and forwarded signal 220). Additionally, repeater 205-a may include a control interface 235, and therefore may process control information 215 received over control channel 210. Repeater 205-a may thus be equipped with an analog interface 230 and a control interface 235.

Various examples of the components of a repeater 205 and operations of the repeater 205 are described in further detail in the examples of FIGS. 8 through 11. Further, circuitry of a repeater 205 may be configured in other layouts. Analog interface 230 may include or refer to analog or RF circuitry, may include various components used within a signal processing chain at a repeater 205, etc. For example, analog interface 230 may include or refer to analog or RF circuitry, phase shifters, mixers, received signal strength indicator (RSSI) components, LNAs, filters, PAs, A/D converters and/or D/A converters, or a combination thereof. In some cases, the analog interface 230 may support analog processing described herein. For example, analog interface 230 (e.g., a LNA) may receive a signal (e.g., signal 220), amplify the signal, and forward the signal (e.g., transmit forwarded signal 225) to UE 115-a. Further, analog interface 230 may measure energy of a signal (e.g., signal 220) during one or more preconfigured slots.

Control interface 235 may include or refer to digital circuitry, may include various components used within a signal processing chain at a repeater 205, etc. For example, control interface 235 may include an A/D converter, and may convert a filtered signal to a digital filtered signal, which may be provided to digital processing and control circuitry. The digital processing and control circuitry may perform digital processing, such as digital filtering, demodulation and decoding, channel estimation, carrier tracking, or combinations thereof, on the received filtered digital signal to output a processed digital signal. In some cases, the control interface 235 may support digital processing described herein. For example, control interface 235 may process a signal (e.g., control information 215) during one or more preconfigured slots (e.g., of control channel 210). In some cases, control interface 235 may be referred to herein as a digital interface.

Figure 3:
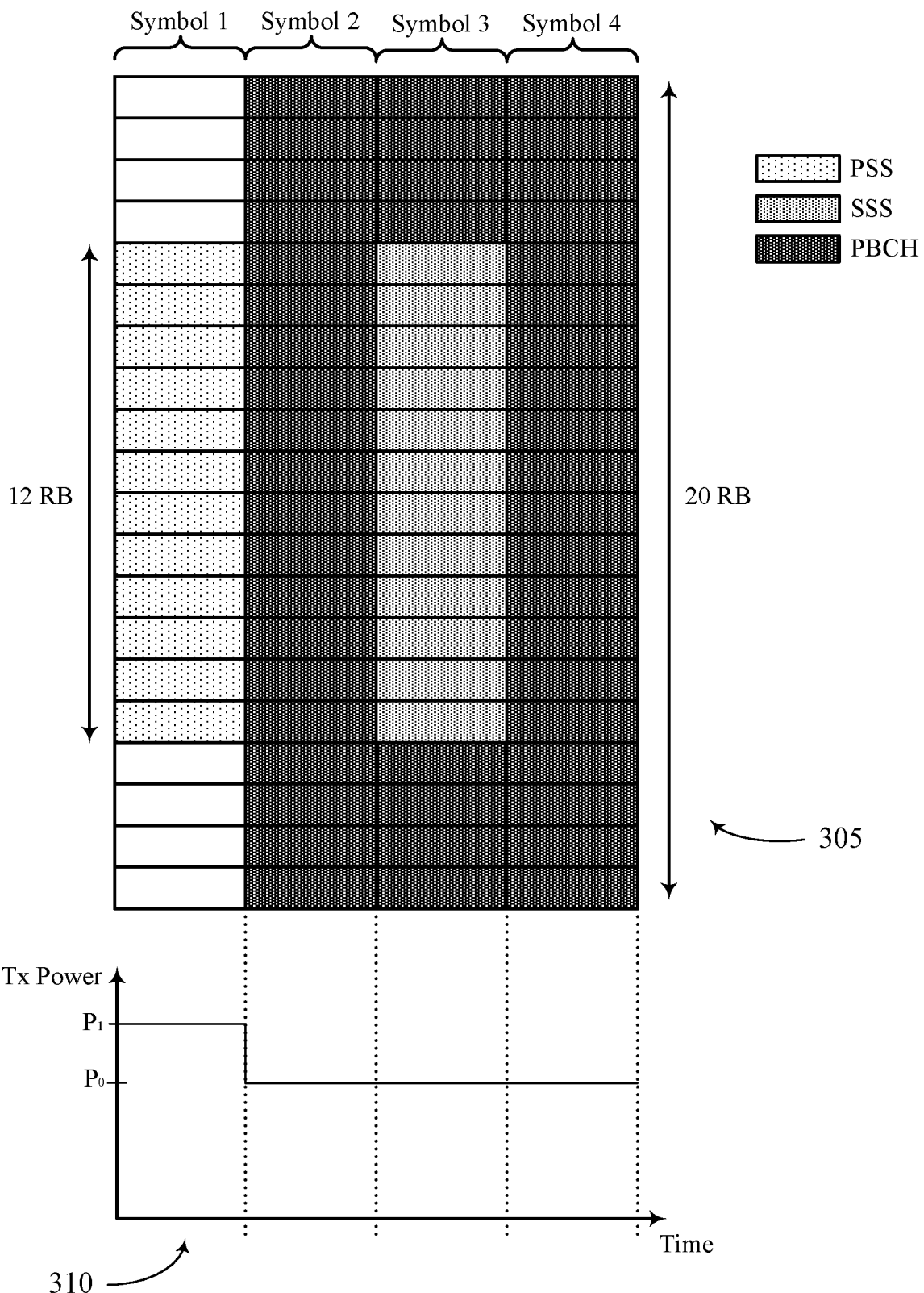
FIG. 3 illustrates an example of a transmission power diagram that supports power saving of smart repeaters based on a triggering signal in accordance with one or more aspects of the present disclosure.

FIG. 3 illustrates an example of a transmission power diagram 300 that supports power saving of smart repeaters based on a triggering signal in accordance with one or more aspects of the present disclosure. In some examples, transmission power diagram 300 may implement aspects of wireless communications system 100 and wireless communications system 200.

Transmission power diagram 300 may illustrate one example of an SSB 305 and a corresponding power profile 310. For example, SSB 305 is illustrated as conveying PSS, SSS, and PBCH via time and frequency resources. In the present example, SSB 305 may include 20 resource blocks (RBs) in the frequency domain and 4 symbols in the time domain. As discussed herein, an SSB 305 may be modified (e.g., power boosted) by a base station to trigger wireless repeater configuration (e.g., to trigger wireless repeater powering of a control interface). In some cases, an SSB 305 may be a same waveform as a normal or default SSB, with a different power envelope or with a different power profile. In the example of FIG. 3, SSB 305 may be associated with a power profile 310. Power profile 310 may illustrate an example where a first symbol (Symbol 1') is power boosted relative to the remainder of the SSB slot (e.g., relative to 'Symbol 2,' 'Symbol 3,' and 'Symbol 4'). For example, a repeater may measure one or more energy levels across the SSB slot, and may measure an average energy level '$P_1$' across a first set of symbols (e.g., across 'Symbol 1a') and may measure an average energy level '$P_0$' across a second set of symbols (e.g., across 'Symbol 2,' 'Symbol 3,' and 'Symbol 4'). In cases where a ratio of $P_1$ to $P_0$ matches a power profile indicated by a control interface triggering configuration, the wireless repeater may power a control interface, as described herein. For example, in some cases $P_1$ may differ from $P_0$ by 3-5 dB, which may trigger control interface powering, in accordance with power threshold information indicated by a control interface triggering configuration.

In some cases, SSB 305 may alternatively be power boosted to a constant power envelope across the four symbols. In such cases, the power threshold information included in a control interface triggering configuration may indicate some constant power envelope (e.g., where if a wireless repeater measures an average energy across the SSB slot (e.g., or an average energy across the four SSB symbols) that exceeds the constant threshold, the wireless repeater may power the control interface. In other cases, other power profiles (e.g., other energy-time-variation patterns in addition to or in alternate to power profile 310) may be used for wireless repeater configuration triggering. As discussed herein, in some cases, the SSB 305 may not be modified in content, as a wireless repeater may use an analog interface to measure energy of the SSB 305, to amplify and forward the SSB 305, etc., without necessarily decoding the SSB 305.

The example of FIG. 3 is provided for illustrative purposes only. Other periodic signals, other power profiles, other power envelopes, etc. are considered by analogy, without departing from the scope of the present disclosure. For example, a base station may configure any power thresholds or power profiles (e.g., where power threshold information may refer to any constant power threshold, any energy-time-variation pattern, etc.) for any periodic signal. Further, such power threshold information may be configured to configure any state of a wireless repeater (e.g., such as a control interface power state, an analog interface power state, a forwarding state, an amplification state, etc.). As such, a wireless repeater may perform energy measurements across a configured slot, and may modify various configurations of the wireless repeater based on certain power threshold information being satisfied, according to various triggering configurations (e.g., and may not be limited to control interface triggering configurations).

Figure 4:
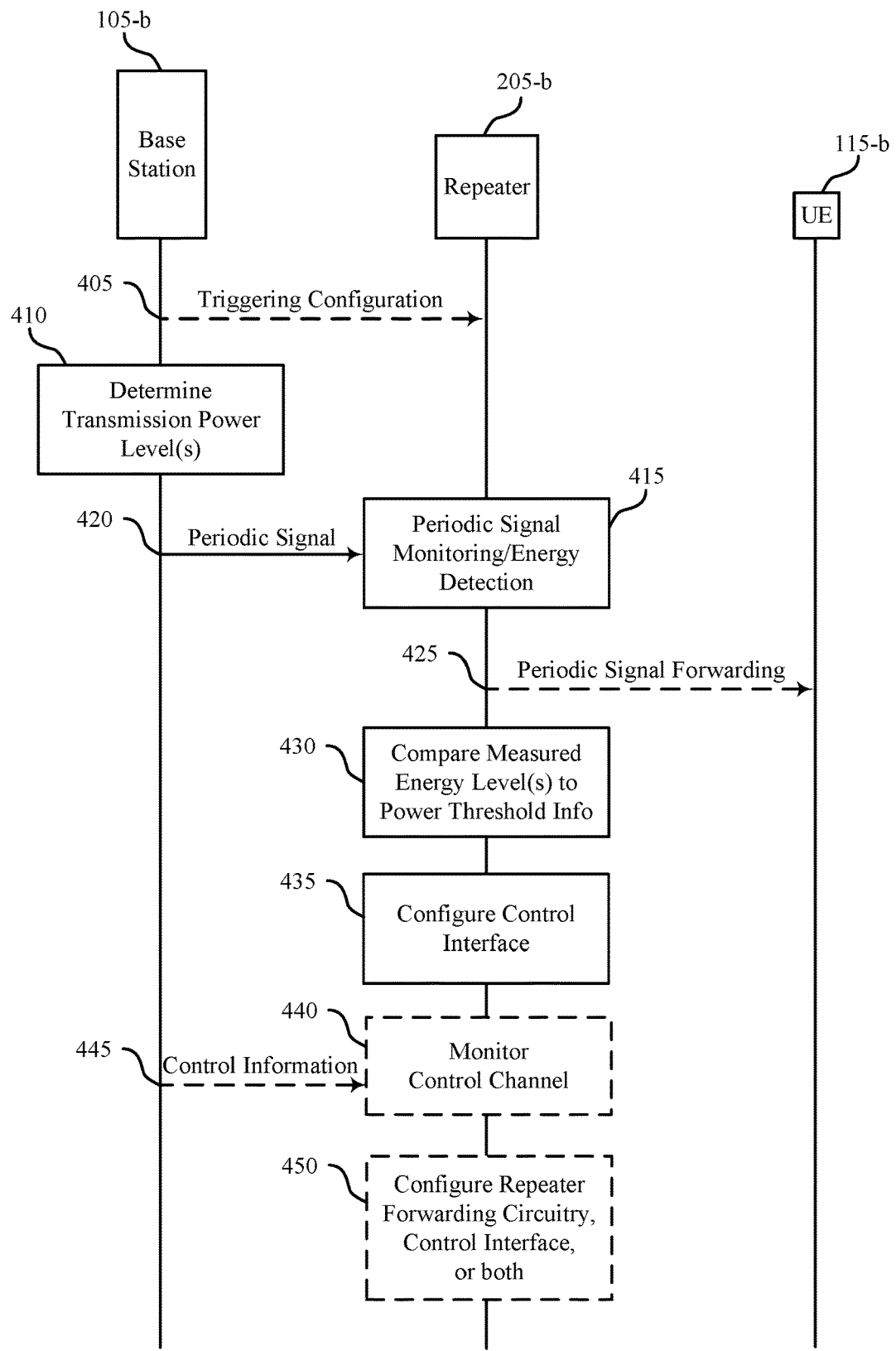
FIG. 4 illustrates an example of a process flow that supports power saving of smart repeaters based on a triggering signal in accordance with one or more aspects of the present disclosure.

FIG. 4 illustrates an example of a process flow 400 that supports power saving of smart repeaters based on a triggering signal in accordance with one or more aspects of the present disclosure. In some examples, process flow 400 may implement aspects of wireless communications system 100, wireless communications system 200, and transmission power diagram 300. The process flow 400 includes a base station 105-b, which may be an example of base stations and network devices described with reference to FIGS. 1 and 2; a repeater 205-b, which may be an example of repeaters (e.g., wireless repeaters) described with reference to FIGS. 1 and 2; and a UE 115-b, which may be an example of a UE described with reference to FIGS. 1 and 2. The process flow 400 includes functions and communications implemented by base station 105-b, repeater 205-b, and UE 115-b in the context of management of repeaters (e.g., for power savings at a repeater).

In the following description of the process flow 400, the operations between base station 105-b, repeater 205-b, and UE 115-b may be transmitted in a different order than the order shown, or the operations may be performed in different orders or at different times. Certain operations may also be left out of the process flow 400, or other operations may be added to the process flow 400. It is to be understood that while base station 105-b, repeater 205-b, and UE 115-b are shown performing a number of the operations of process flow 400, any wireless device may perform the operations shown.

At 405, base station 105-b may transmit a control interface triggering configuration to repeater 205-b. The control interface triggering configuration may include power threshold information for powering of a control interface of the repeater 205-b. For example, the power threshold information may include a power threshold for one or more energy level measurements, a power profile for the one or more energy level measurements across a configured time period (e.g., a time period configured for a periodic signal transmitted at 420), or both. The power threshold for the one or more energy level measurements may include a constant power envelope for the configured time period (e.g., the power threshold for the one or more energy level measurements may refer to a threshold for repeater 205-b identification of power boosting (e.g., and thus control interface triggering) by the base station 105-b). The power profile for the configured time period may include an energy-time-variation pattern across the configured time period.

At 410, base station 105-b may determine one or more transmission power levels for a periodic signal over a configured time period based on a configuration of the repeater 205-b and the control interface triggering configuration transmitted at 405. For example, base station 105-b may determine whether to send new control information to the repeater 205-b based at least in part on the configuration of the repeater 205-b (e.g., based on the configuration of repeater 205-b, the base station may determine whether the current state of the repeater is suitable based on whether or not new control information is to be sent to the repeater 205-b). Base station 105-b may then determine whether to trigger powering of the control interface of the wireless repeater based at least in part on the determination of whether to send the new control information to the wireless repeater, and may determine the one or more transmission power levels based on whether or not the base station 105-b will trigger configuration of the repeater 205-b. That is, the one or more transmission power levels for the periodic signal may be determined based on the base station 105-b determination of whether to trigger powering of the control interface of the repeater 205-b.

In some cases, determining one or more transmission power levels for the periodic signal may refer to boosting at least one of the one or more transmission power levels by a difference (e.g., 3-5 dB) compared to a remainder of the one or more transmission power levels (e.g., where the power threshold information indicated at 405 may include the difference). For example, as described herein, base station 105-b may boost a first symbol of an SSB relative to remaining symbols of an SSB (e.g., by 3-5 dB), where the control interface triggering configuration may indicate a power profile indicative of the energy-time-variation pattern across the symbols of the SSB.

At 415, repeater 205-b may monitor for a periodic signal, and may detect energy (e.g., measure one or more energy levels) during a time period configured for the periodic signal. In some cases, the measuring of one or more energy levels may be based on the control interface triggering configuration received at 405. For example, in cases where the control interface triggering configuration indicates a power threshold or a power envelope, repeater 205-b may measure an average energy level across the configured time period. In cases where the average energy level exceeds some threshold (e.g., 2-5 dB over some default power level associated with the periodic signal), repeater 205-b may power a control interface (e.g., or transition the control interface to a fast state) at 435. In other examples where the control interface triggering configuration indicates a power profile, repeater 205-b may perform two or more energy measurements (e.g., a first measurement across a first symbol of an SSB and a second average energy measurement across remaining symbols of the SSB). In such cases, the repeater 205-b may compare the two or more energy measurements to the power profile (e.g., and in cases where the two or more energy measurements match the power profile, the repeater 205-b may power a control interface (e.g., or transition the control interface to a fast state) at 435.

As discussed herein, at 430, repeater 205-*b* may compare the one or more energy measurements (e.g., performed at 415) to power threshold information included in the control interface triggering configuration. In cases where the control interface triggering configuration indicates a power profile, repeater 205-*b* may determine a ratio between a first measured energy level of the one or more measured energy levels and a second measured energy level of the one or more measured energy levels, where the first measured energy level comprises a first average power level of a first set of symbols of the periodic signal (e.g., of a first symbol of an SSB) and the second measured energy level comprises a second average power level of a second set of symbols of the periodic signal (e.g., of symbols 2-4 of an SSB). Repeater 205-*b* may then determine the one or more measured energy levels match the power profile based at least in part on the ratio. For example, a power profile may indicate a pattern of power variation across the first set of symbols of the periodic signal and the second set of symbols of the periodic signal, and the repeater 205-*b* may determine a ratio (e.g., may determine that an average energy of the first symbol is boosted by 3-5 dB relative to an average energy of the remaining three symbols). In cases where the power profile indicates such a power variation, the repeater 205-*b* may determine that a control interface configuration has been triggered (e.g., that the repeater is to power on the control interface for some first time duration).

At 435, repeater 205-*b* may configure a control interface based on the comparison at 430 (e.g., based on whether the periodic signal at 420 triggers powering of the control interface, in accordance with the control interface triggering configuration). In cases where the one or more energy levels exceed the power threshold or match the power profile indicated by the control interface triggering configuration, repeater 205-*b* may power the control interface for a first time duration at 435 (e.g., where the first time duration may be preconfigured, or may be configured by the control interface triggering configuration received at 405). In cases where the one or more energy levels do not exceed the power threshold or do not match the power profile indicated by the control interface triggering configuration, repeater 205-*b* may transition to a low power state (e.g., power off the control interface, maintain the control interface in a lower power state, etc.).

At 440, in cases where the repeater 205-*b* powers a control interface for a first time duration (e.g., in cases where the one or more energy levels exceed the power threshold or match the power profile indicated by the control interface triggering configuration), repeater 205-*b* may monitor a control channel at 440 based on the powering of the control interface. For example, at 440, repeater 205-*b* may monitor a control channel for a first time duration, where the first time duration may be some configured duration or timer associated with the powering of the control interface. In some cases, the first time duration may be indicated by the control interface triggering configuration, may be preconfigured by the wireless communications system, etc.

As discussed herein, a repeater 205-*b* may transition back to a low power state in cases where additional control information is not received from base station 105-*b* prior to expiration of the first time duration (e.g., in cases where control information is not received at 445). Alternatively, in some cases, repeater 205-*b* may receive additional control information from base station 105-*b* at 445. In such cases, at 450, base station 105-*b* may configure repeater forwarding circuitry, configure the control interface, or both, based on the control information received at 445. For example, in some cases control information at 445 may include a new repeater configuration for a subsequent transmission, and the repeater 205-*b* may configure repeater forwarding circuitry in accordance with the new repeater configuration. In other cases, the control information at 445 may include control commands for configuration of the control interface of the repeater 205-*b*, and the repeater 205-*b* may configure the control interface in accordance with the control commands. For example, control information at 445 may include one or more control commands such as a low power command, a fast command, an indication of a monitoring periodicity, etc. for a control interface of the repeater 205-*b*.

Figure 5:
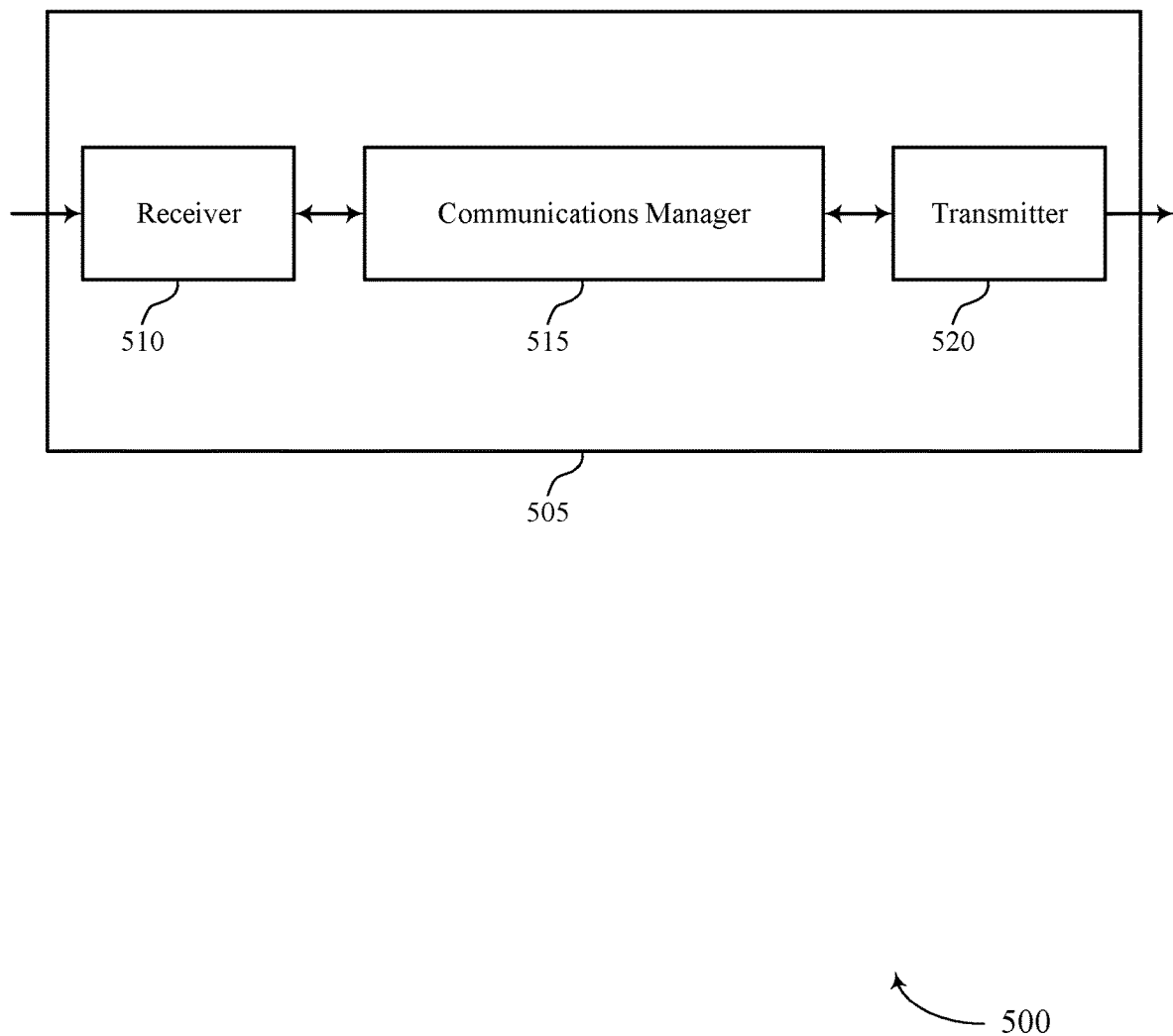
FIGS. 5 and 6 show block diagrams of devices that support power saving of smart repeaters based on a triggering signal in accordance with one or more aspects of the present disclosure.

FIG. 5 shows a block diagram 500 of a device 505 that supports power saving of smart repeaters based on a triggering signal in accordance with one or more aspects of the present disclosure. The device 505 may be an example of aspects of a network device 105 or a base station 105 as described herein. The device 505 may include a receiver 510, a communications manager 515, and a transmitter 520. The device 505 may also include a processor. Each of these components may be in communication with one another (e.g., via one or more buses).

The receiver 510 may provide a means for receiving information such as packets, user data, or control information associated with various information channels (e.g., control channels, data channels, and information related to power saving of smart repeaters based on a triggering signal, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may support wireless communication in accordance with examples as disclosed herein. The communications manager 515 may provide means for transmitting a control interface triggering configuration to a wireless repeater, where the control interface triggering configuration includes power threshold information for powering of a control interface of the wireless repeater. The communications manager 515 may provide means for determining one or more transmission power levels for a periodic signal over a configured time period based on a configuration of the wireless repeater and the control interface triggering configuration, and means for transmitting the periodic signal during the configured time period based on the one or more determined transmission power levels. The communications manager 515 may be an example of aspects of the communications manager 810 described herein.

The communications manager 515 may be an example of means for performing various aspects of managing smart repeaters as described herein. The communications manager 515, or its sub-components, may be implemented in hardware (e.g., in communications management circuitry). The circuitry may be comprised of a processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

In another example, the communications manager 515, or its sub-components, may be implemented in code (e.g., as communications management software or firmware) executed by a processor, or any combination thereof. If implemented in code, executed by a processor, the functions of the communications manager 515, or its sub-components may be executed by a general-purpose processor, a DSP, an ASIC, and an FPGA or other programmable logic device.

In some examples, the communication manager 515 may be configured to perform various operations (e.g., receiving, determining, transmitting) using or otherwise in cooperation with the receiver 510, the transmitter 520, or both.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may provide means for transmitting signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
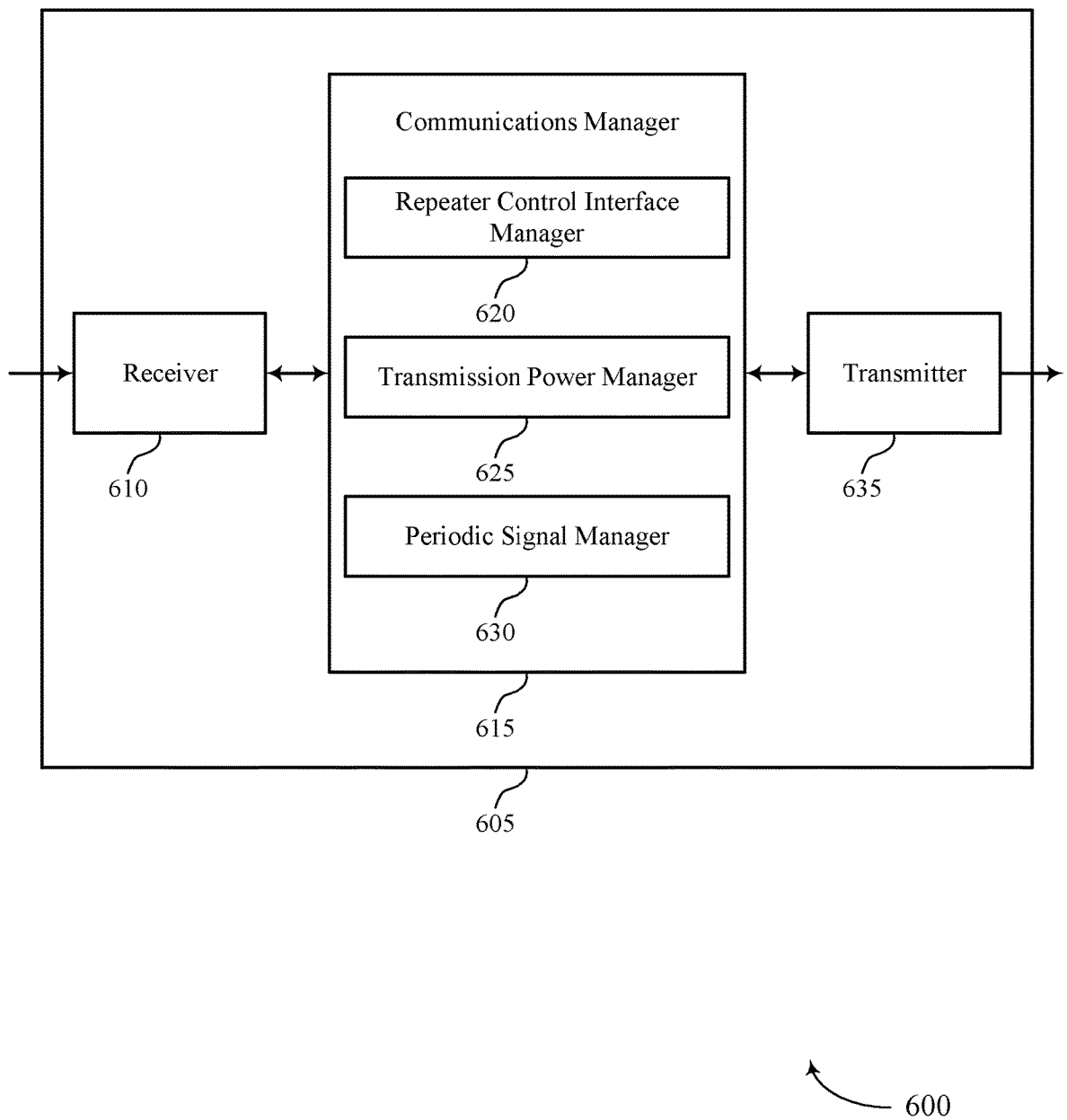

FIG. 6 shows a block diagram 600 of a device 605 that supports power saving of smart repeaters based on a triggering signal in accordance with one or more aspects of the present disclosure. The device 605 may be an example of aspects of a device 505, a network device 105, or a base station 105 as described herein. The device 605 may include a receiver 610, a communications manager 615, and a transmitter 635. The device 605 may also include a processor. Each of these components may be in communication with one another (e.g., via one or more buses).

The receiver 610 may provide means for receiving information such as packets, user data, or control information associated with various information channels (e.g., control channels, data channels, and information related to power saving of smart repeaters based on a triggering signal, etc.). Information may be passed on to other components of the device 605. The receiver 610 may be an example of aspects of the transceiver 820 described with reference to FIG. 8. The receiver 610 may utilize a single antenna or a set of antennas.

The communications manager 615, or components thereof, may be an example of means for performing various aspects of managing smart repeaters as described herein. The communications manager 615 may include a repeater control interface manager 620, a transmission power manager 625, and a periodic signal manager 630. The communications manager 615 may be an example of aspects of the communications manager 810 described herein. The communications manager 615 may be an example of the communication manager 515 as described herein. In some examples, the communication manager 215 may be configured to perform various operations (e.g., receiving, monitoring, transmitting) using or otherwise in cooperation with one or both of the receiver 610 or the transmitter 635.

The repeater control interface manager 620 may provide or support means for transmitting a control interface triggering configuration to a wireless repeater, where the control interface triggering configuration includes power threshold information for powering of a control interface of the wireless repeater. The transmission power manager 625 may provide or support means for determining one or more transmission power levels for a periodic signal over a configured time period based on a configuration of the wireless repeater and the control interface triggering configuration. The periodic signal manager 630 may provide or support means for transmitting the periodic signal during the configured time period based on the one or more determined transmission power levels.

The transmitter 635 may provide or support means for transmitting signals generated by other components of the device 605. In some examples, the transmitter 635 may be collocated with a receiver 610 in a transceiver module. For example, the transmitter 635 may be an example of aspects of the transceiver 820 described with reference to FIG. 8. The transmitter 635 may utilize a single antenna or a set of antennas.

Figure 7:
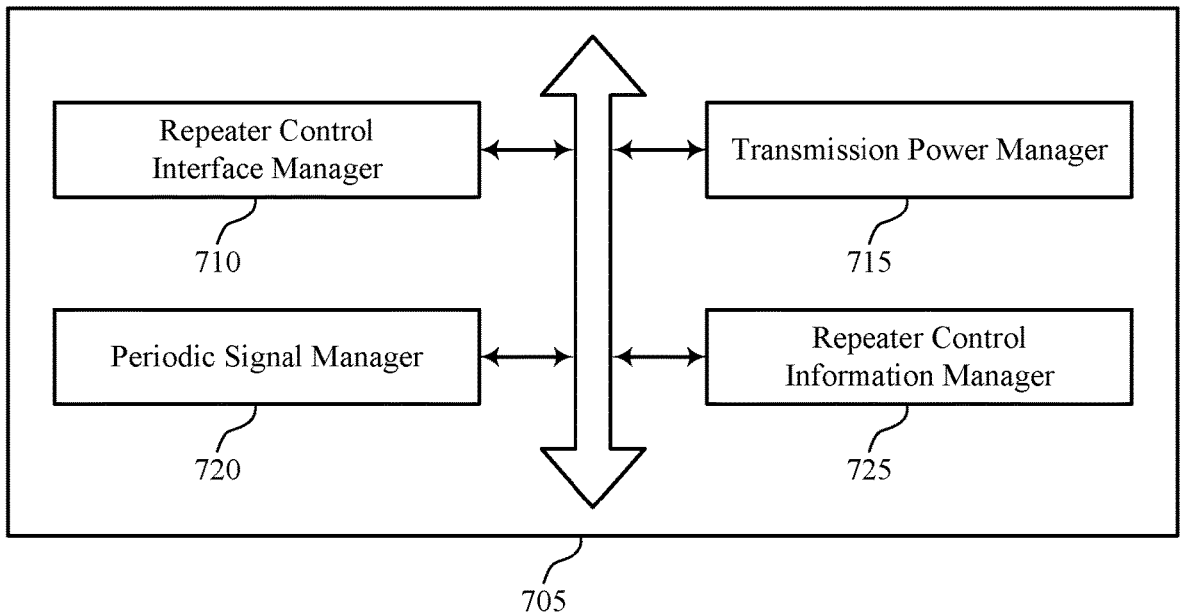
FIG. 7 shows a block diagram of a communications manager that supports power saving of smart repeaters based on a triggering signal in accordance with one or more aspects of the present disclosure.

FIG. 7 shows a block diagram 700 of a communications manager 705 that supports power saving of smart repeaters based on a triggering signal in accordance with one or more aspects of the present disclosure. The communications manager 705 may be an example of aspects of a communications manager 515, a communications manager 615, a communications manager 810, or all, as described herein. The communications manager 705, or various components thereof, may be an example of means for performing various aspects of managing smart repeaters as described herein. For example, the communications manager 705 may include a repeater control interface manager 710, a transmission power manager 715, a periodic signal manager 720, and a repeater control information manager 725. Each of these modules may communicate, directly or indirectly, with one another (e.g., via one or more buses).

The repeater control interface manager 710 may provide or support means for transmitting a control interface triggering configuration to a wireless repeater, where the control interface triggering configuration includes power threshold information for powering of a control interface of the wireless repeater. In some examples, the repeater control interface manager 710 may provide or support means for determining to trigger powering of the control interface of the wireless repeater based on the new control information, where at least one of the one or more transmission power levels are determined based on the determination to trigger powering of the control interface of the wireless repeater.

The transmission power manager 715 may provide or support means for determining one or more transmission power levels for a periodic signal over a configured time period based on a configuration of the wireless repeater and the control interface triggering configuration. In some examples, the transmission power manager 715 may provide or support means for boosting the at least one of the one or more transmission power levels for the periodic signal. In some examples, the transmission power manager 715 may provide or support means for boosting the at least one of the one or more transmission power levels by a difference compared to a remainder of the one or more transmission power levels, where the power threshold information includes the difference.

In some cases, the one or more transmission power levels for the periodic signal over the configured time period are determined based on the determination of whether to trigger powering of the control interface of the wireless repeater and the power threshold information. In some cases, the boosting is based on the power threshold information. In some cases, the power threshold information includes a power threshold for the one or more transmission power levels, a power profile for the configured time period, or both. In some cases, the power threshold for the one or more transmission power levels includes a constant power envelope for the configured time period. In some cases, the power profile for the configured time period includes an energy-time-variation pattern across the configured time period.

The periodic signal manager 720 may provide or support means for transmitting the periodic signal during the configured time period based on the one or more determined transmission power levels. In some cases, the periodic signal includes a synchronization signal block and the configured time period includes four symbols of the synchronization signal block.

The repeater control information manager 725 may provide or support means for determining whether to send new control information to the wireless repeater based on the configuration of the wireless repeater. In some examples, the repeater control information manager 725 may provide or support means for determining whether to trigger powering of the control interface of the wireless repeater based on the determination of whether to send the new control information to the wireless repeater. In some examples, the repeater control information manager 725 may provide or support means for determining new control information for the wireless repeater. In some examples, the repeater control information manager 725 may provide or support means for transmitting the new control information to the wireless repeater prior to expiration of a first time duration, where the control interface triggering configuration indicates the first time duration.

Figure 8:
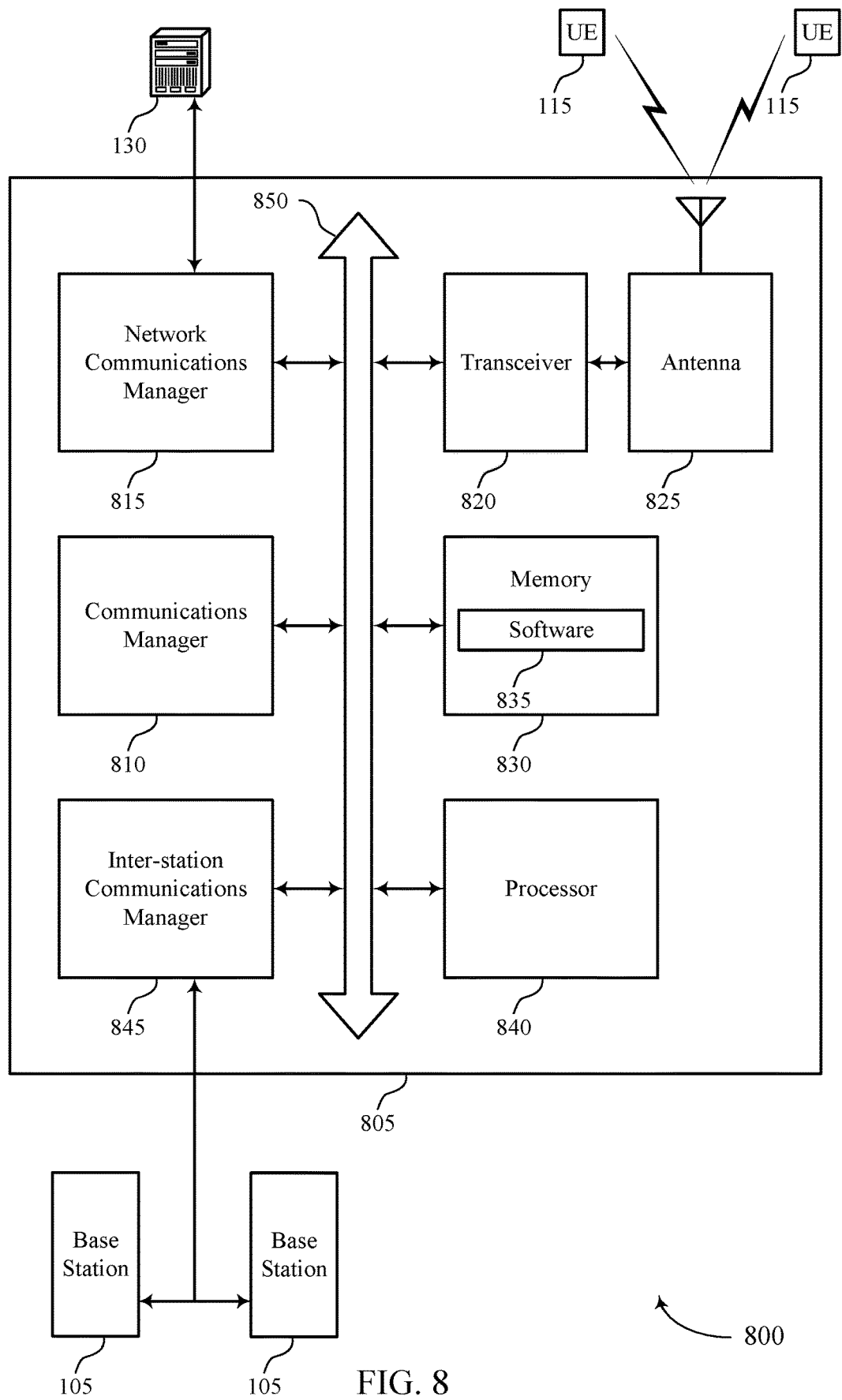
FIG. 8 shows a diagram of a system including a device that supports power saving of smart repeaters based on a triggering signal in accordance with one or more aspects of the present disclosure.

FIG. 8 shows a diagram of a system 800 including a device 805 that supports power saving of smart repeaters based on a triggering signal in accordance with one or more aspects of the present disclosure. The device 805 may be an example of or include the components of device 505, device 605, a network device 105, or a base station 105 as described herein. The device 805 may communicate wirelessly with one or more base stations 105, UEs 115, or any combination thereof. The device 805 may include components for bi-directional voice and data communications including components for transmitting and receiving communications, including a communications manager 810, a network communications manager 815, a transceiver 820, an antenna 825, memory 830, a processor 840, and an inter-station communications manager 845. These components may be in electronic communication via one or more buses (e.g., bus 850).

The communication manager 810, or various components thereof, may be an example of means for performing various aspects of managing smart repeaters as described herein. For example, the communications manager 810 may transmit a control interface triggering configuration to a wireless repeater, where the control interface triggering configuration includes power threshold information for powering of a control interface of the wireless repeater, determine one or more transmission power levels for a periodic signal over a configured time period based on a configuration of the wireless repeater and the control interface triggering configuration, and transmit the periodic signal during the configured time period based on the one or more determined transmission power levels.

In some examples, the communication manager 810 may be configured to perform various operations (e.g., receiving, determining, transmitting) using or otherwise in cooperation with one or both of the transceiver 820 or the one or more antennas 825. Although the communication manager 810 is illustrated as a separate component, in some examples, one or more functions described with reference to the communication manager 810 may be supported by or performed by the processor 840, the memory 830, the code 835, or any combination thereof. For example, the code 835 may include instructions executable by the processor 840 to cause the device 805 to perform various aspects of managing smart repeaters as described herein, or the processor 840 and the memory 830 may be otherwise configured to perform or support such operations.

The network communications manager 815 may manage communications with the core network (e.g., via one or more wired backhaul links). For example, the network communications manager 815 may manage the transfer of data communications for client devices, such as one or more UEs 115.

In some cases, the wireless device may include a single antenna 825. However, in some cases the device may have more than one antenna 825, which may be capable of concurrently transmitting or receiving multiple wireless transmissions. The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the one or more antennas. The transceiver 820 may be an example of a transmitter 520, a transmitter 635, a receiver 510, a receiver 610, or any combination thereof, as described herein.

The memory 830 may include RAM, ROM, or a combination thereof. The memory 830 may store computer-readable code or software 835 including instructions that, when executed by a processor (e.g., the processor 840) cause the device to perform various functions described herein. In some cases, the memory 830 may contain, among other things, a basic input/output system (BIOS) which may control basic hardware or software operation such as the interaction with peripheral components or devices.

The processor 840 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 840 may be configured to operate a memory array using a memory controller. In some cases, a memory controller may be integrated into processor 840. The processor 840 may be configured to execute computer-readable instructions stored in a memory (e.g., the memory 830) to cause the device 805 to perform various functions (e.g., functions or tasks supporting power saving of smart repeaters based on a triggering signal).

The inter-station communications manager 845 may manage communications with other base station 105, and may include a controller or scheduler for controlling communications with UEs 115 in cooperation with other base stations 105. For example, the inter-station communications manager 845 may coordinate scheduling for transmissions to UEs 115 for various interference mitigation techniques such as beamforming or joint transmission. In some examples, the inter-station communications manager 845 may provide an X2 interface within an LTE/LTE-A wireless communication network technology to provide communication between base stations 105.

The software 835 may include instructions to implement aspects of the present disclosure, including instructions to support wireless communications. The software 835 may be stored in a non-transitory computer-readable medium such as system memory or other type of memory. In some cases, the software 835 may not be directly executed by the processor 840 but may cause a computer (e.g., when compiled and executed) to perform functions described herein.

Figure 9:
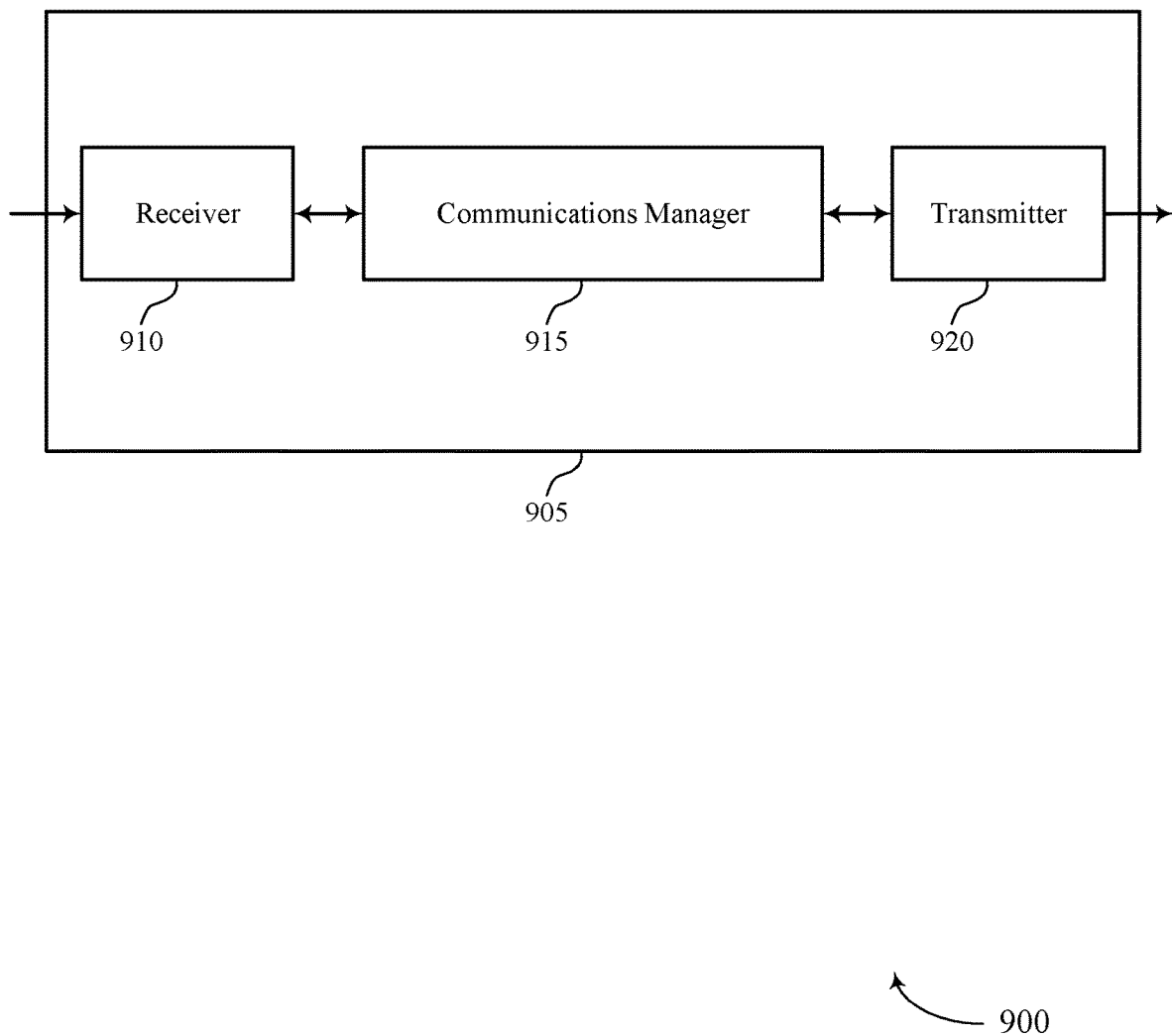
FIGS. 9 and 10 show block diagrams of devices that support power saving of smart repeaters based on a triggering signal in accordance with one or more aspects of the present disclosure.

FIG. 9 shows a block diagram 900 of a device 905 that supports power saving of smart repeaters based on a triggering signal in accordance with one or more aspects of the present disclosure. The device 905 may be an example of aspects of a repeater 140, a repeater 205, or a wireless repeater as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to power saving of smart repeaters based on a triggering signal, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may receive a control interface triggering configuration from a base station, where the control interface triggering configuration includes power threshold information for powering of a control interface of the wireless repeater. The communications manager 915 may receive, from the base station, a periodic signal during a configured time period, and measure one or more energy levels associated with the received periodic signal across the configured time period based on the received control interface triggering configuration. The communications manager 915 may configure the control interface based on the one or more measured energy levels and the control interface triggering configuration. The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
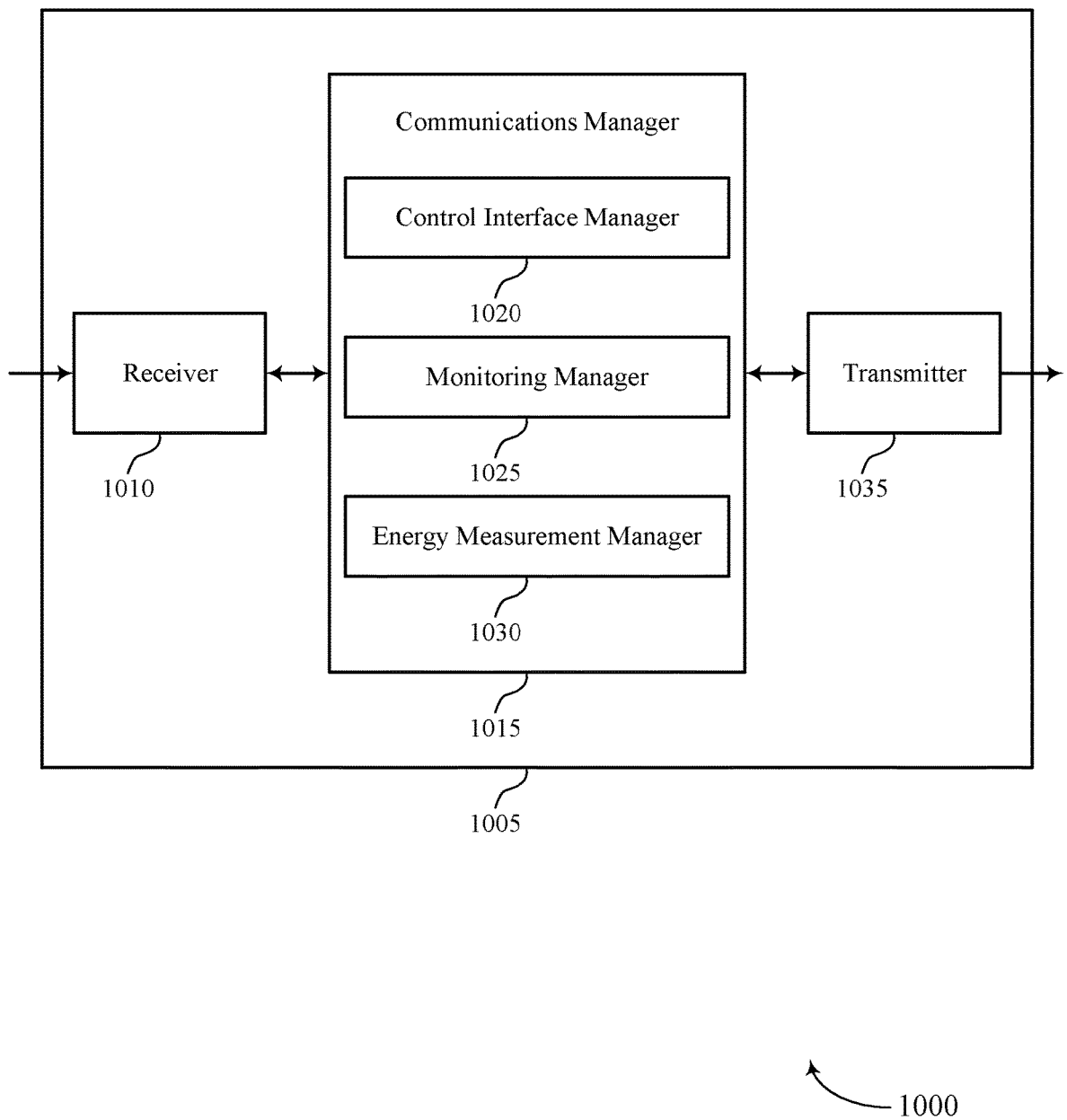

FIG. 10 shows a block diagram 1000 of a device 1005 that supports power saving of smart repeaters based on a triggering signal in accordance with one or more aspects of the present disclosure. The device 1005 may be an example of aspects of a device 905, a repeater 140, a repeater 205, or a wireless repeater as described herein. The device 1005 may include a receiver 1010, a communications manager 1015, and a transmitter 1035. The device 1005 may also include a processor. Each of these components may be in communication with one another (e.g., via one or more buses).

The receiver 1010 may provide or support means for receiving information such as packets, user data, or control information associated with various information channels (e.g., control channels, data channels, and information related to power saving of smart repeaters based on a triggering signal, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a control interface manager 1020, a monitoring manager 1025, and an energy measurement manager 1030. The communications manager 1015 may be an example of aspects of the communications manager 1210 described herein.

The control interface manager 1020 may provide or support means for receiving a control interface triggering configuration from a base station, where the control interface triggering configuration includes power threshold information for powering of a control interface of the wireless repeater. The monitoring manager 1025 may provide or support means for receiving, from the base station, a periodic signal during a configured time period. The energy measurement manager 1030 may provide or support means for measuring one or more energy levels associated with the received periodic signal across the configured time period based on the received control interface triggering configuration. The control interface manager 1020 may provide or support means for configuring the control interface based on the one or more measured energy levels and the control interface triggering configuration.

The transmitter 1035 may provide or support means for transmitting signals generated by other components of the device 1005. In some examples, the transmitter 1035 may be collocated with a receiver 1010 in a transceiver module. For example, the transmitter 1035 may be an example of aspects of the transceiver 1220 described with reference to FIG. 12. The transmitter 1035 may utilize a single antenna or a set of antennas.

Figure 11:
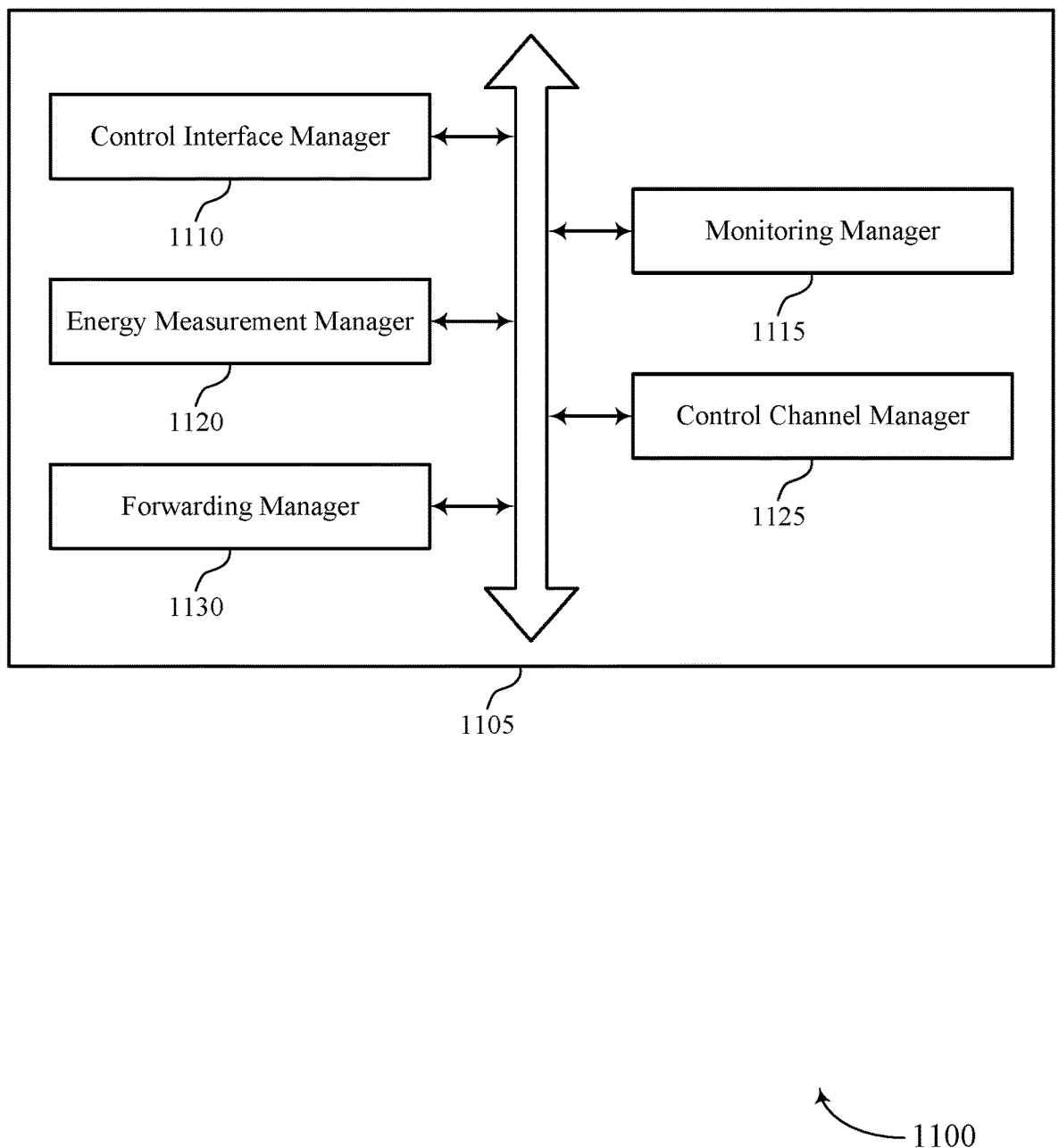
FIG. 11 shows a block diagram of a communications manager that supports power saving of smart repeaters based on a triggering signal in accordance with one or more aspects of the present disclosure.

FIG. 11 shows a block diagram 1100 of a communications manager 1105 that supports power saving of smart repeaters based on a triggering signal in accordance with one or more aspects of the present disclosure. The communications manager 1105 may be an example of aspects of a communications manager 915, a communications manager 1015, or a communications manager 1210 described herein. The communications manager 1105 may include a control interface manager 1110, a monitoring manager 1115, an energy measurement manager 1120, a control channel manager 1125, and a forwarding manager 1130. Each of these modules may communicate, directly or indirectly, with one another (e.g., via one or more buses).

The control interface manager 1110 may provide or support means for receiving a control interface triggering configuration from a base station, where the control interface triggering configuration includes power threshold information for powering of a control interface of the wireless repeater. In some examples, the control interface manager 1110 may provide or support means for configuring the control interface based on the one or more measured energy levels and the control interface triggering configuration. In some examples, the control interface manager 1110 may provide or support means for powering the control interface for a first time duration based on the one or more measured energy levels exceeding the power threshold. In some examples, control interface manager 1110 may provide or support means for receiving, from the base station, control information prior to expiration of the first time duration based on the monitoring of the control channel, where the control information includes one or more commands for the control interface.

In some examples, the control interface manager 1110 may provide or support means for configuring the control interface based on the one or more commands. In some examples, the control interface manager 1110 may provide or support means for powering off the control interface upon expiration of the first time duration. In some examples, the control interface manager 1110 may provide or support means for powering the control interface for a first time duration based on the one or more measured energy levels matching the power profile. In some examples, the control interface manager 1110 may provide or support means for transitioning to a low power state based on the one or more measured energy levels being less than the power threshold. In some examples, the control interface manager 1110 may provide or support means for transitioning to a low power state based on the one or more measured energy levels being different than the power profile. In some examples, the control interface manager 1110 may provide or support means for powering the control interface for a first time duration or transitioning to a low power state based on a difference between the first average energy level and the second average energy level. In some cases, the power threshold information includes the difference.

The monitoring manager 1115 may provide or support means for receiving, from the base station, a periodic signal during a configured time period. In some cases, the periodic signal includes a synchronization signal block and the configured time period includes four symbols of the synchronization signal block. The energy measurement manager 1120 may provide or support means for measuring one or more energy levels associated with the received periodic signal across the configured time period based on the received control interface triggering configuration. In some examples, energy measurement manager 1120 may provide or support means for comparing the one or more measured energy levels to the power threshold information, where the power threshold information includes a power threshold for the one or more measured energy levels, a power profile for the configured time period, or both.

In some examples, energy measurement manager 1120 may provide or support means for determining a ratio between a first measured energy level of the one or more measured energy levels and a second measured energy level of the one or more measured energy levels, where the first measured energy level includes a first average power level of a first set of symbols of the periodic signal and the second measured energy level includes a second average power level of a second set of symbols of the periodic signal. In some examples, the energy measurement manager 1120 may provide or support means for determining the one or more measured energy levels match the power profile based on the ratio. In some examples, the energy measurement manager 1120 may compare the ratio to the power profile.

In some examples, the energy measurement manager 1120 may provide or support means for measuring a first average energy level of the received periodic signal across a first symbol of the configured time period. In some examples, the energy measurement manager 1120 may provide or support means for measuring a second average energy level of the received periodic signal across one or more remaining symbols of the configured time period. In some cases, the power profile includes a pattern of power variation across the first set of symbols of the periodic signal and the second set of symbols of the periodic signal. In some cases, the power threshold for the one or more measured energy levels includes a constant power envelope for the configured time period. In some cases, the power profile for the configured time period includes an energy-time-variation pattern across the configured time period.

The control channel manager 1125 may provide or support means for monitoring a control channel using the control interface for the first time duration based on powering on the control interface. In some examples, the control channel manager 1125 may monitor a control channel using the control interface for the first time duration based on powering on the control interface. The forwarding manager 1130 may provide or support means for performing an amplification operation on the received periodic signal. In some examples, the forwarding manager 1130 may transmit the amplified periodic signal to a UE.

Figure 12:
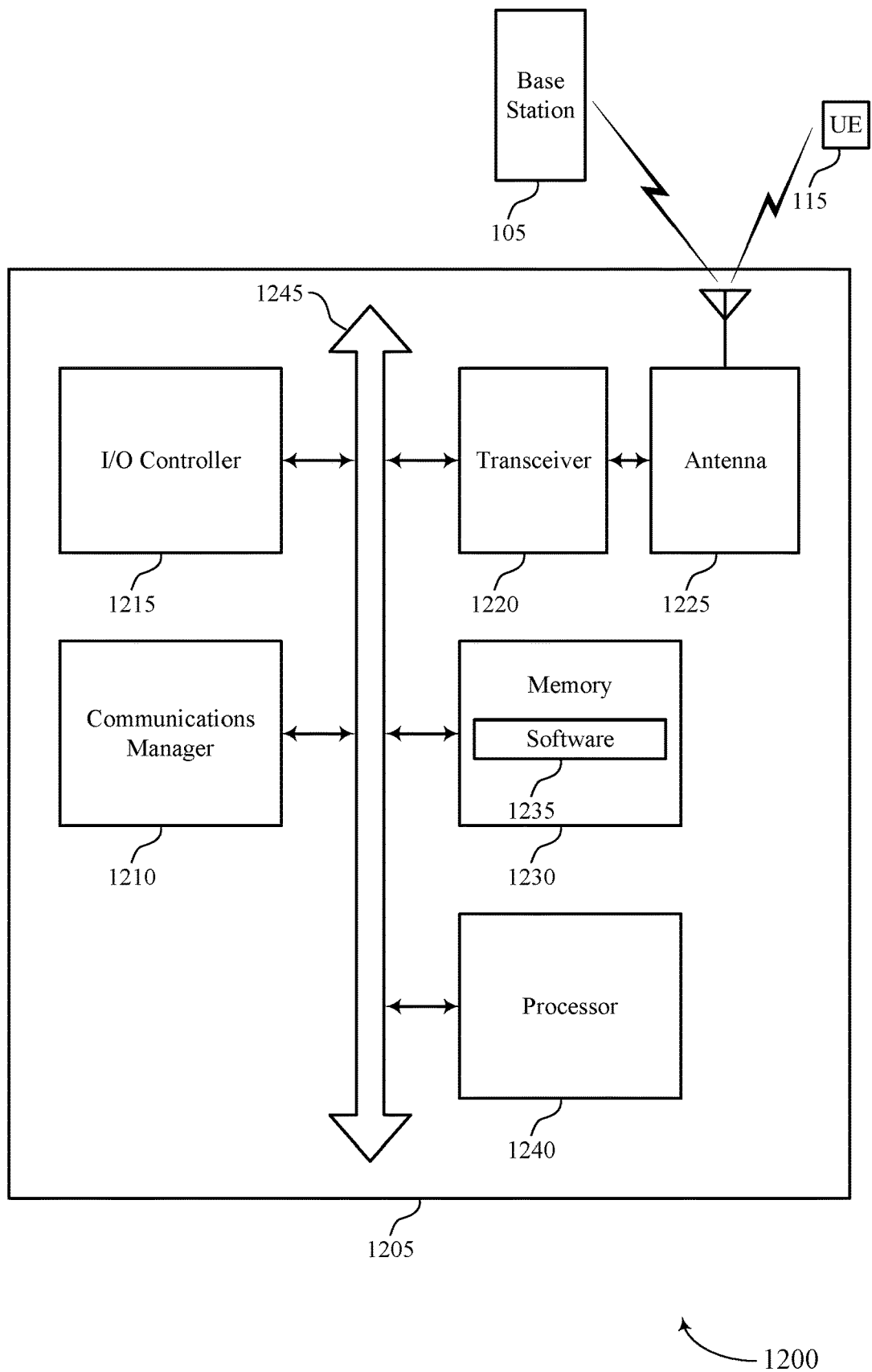
FIG. 12 shows a diagram of a system including a device that supports power saving of smart repeaters based on a triggering signal in accordance with one or more aspects of the present disclosure.

FIG. 12 shows a diagram of a system 1200 including a device 1205 that supports power saving of smart repeaters based on a triggering signal in accordance with one or more aspects of the present disclosure. The device 1205 may be an example of or include the components of device 905, device 1005, a repeater 140, a repeater 205, or a wireless repeater as described herein. The device 1205 may include components for bi-directional voice and data communications including components for transmitting and receiving communications, including a communications manager 1210, an I/O controller 1215, a transceiver 1220, an antenna 1225, memory 1230, and a processor 1240. These components may be in electronic communication via one or more buses (e.g., bus 1245).

The communications manager 1210 may provide or support means for receiving a control interface triggering configuration from a base station, where the control interface triggering configuration includes power threshold information for powering of a control interface of the wireless repeater, receive, from the base station, a periodic signal during a configured time period, measure one or more energy levels associated with the received periodic signal across the configured time period based on the received control interface triggering configuration, configure the control interface based on the one or more measured energy levels and the control interface triggering configuration.

The I/O controller 1215 may manage input and output signals for the device 1205. The I/O controller 1215 may also manage peripherals not integrated into the device 1205. In some cases, the I/O controller 1215 may represent a physical connection or port to an external peripheral. In some cases, the I/O controller 1215 may utilize an operating system such as iOS®, ANDROID®, MS-DOS®, MS-WINDOWS®, OS/2®, UNIX®, LINUX®, or another known operating system. In other cases, the I/O controller 1215 may represent or interact with a modem, a keyboard, a mouse, a touchscreen, or a similar device. In some cases, the I/O controller 1215 may be implemented as part of a processor. In some cases, a user may interact with the device 1205 via the I/O controller 1215 or via hardware components controlled by the I/O controller 1215.

In some cases, the wireless device may include a single antenna 1225. However, in some cases the device may have more than one antenna 1225, which may be capable of concurrently transmitting or receiving multiple wireless transmissions. The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the one or more antennas. The transceiver 820 may be an example of a transmitter 520, a transmitter 635, a receiver 510, a receiver 610, or any combination thereof, as described herein.

The memory 1230 may include random-access memory (RAM) and read-only memory (ROM). The memory 1230 may store computer-readable, computer-executable code or software 1235 including instructions that, when executed, cause the processor to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting power saving of smart repeaters based on a triggering signal).

The software 1235 may include instructions to implement aspects of the present disclosure, including instructions to support wireless communications. The software 1235 may be stored in a non-transitory computer-readable medium such as system memory or other type of memory. In some cases, the software 1235 may not be directly executed by the processor 1240 but may cause a computer (e.g., when compiled and executed) to perform functions described herein.

Figure 13:
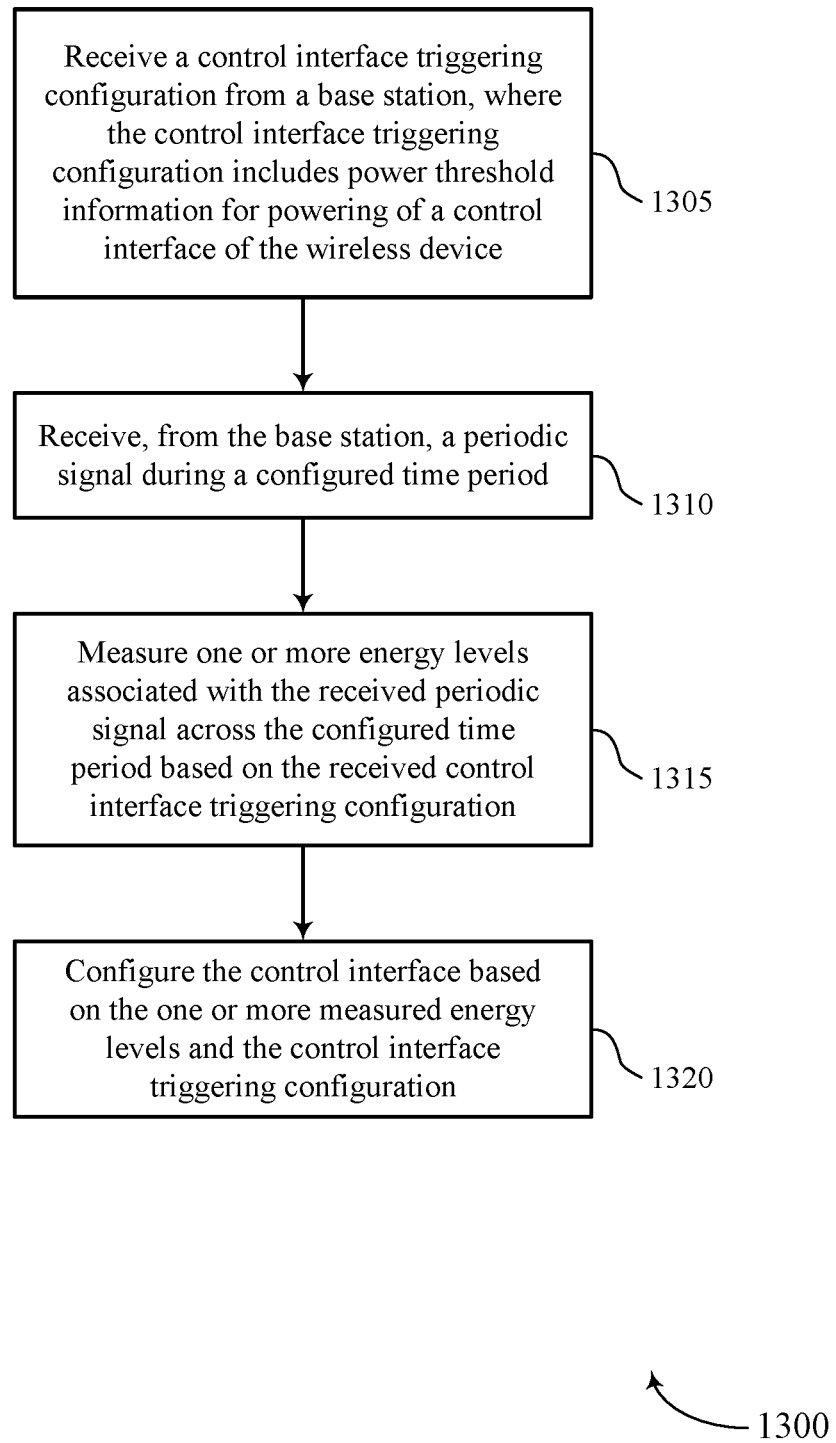
FIGS. 13 through 18 show flowcharts illustrating methods that support power saving of smart repeaters based on a triggering signal in accordance with one or more aspects of the present disclosure.

FIG. 13 shows a flowchart illustrating a method 1300 that supports power saving of smart repeaters based on a triggering signal in accordance with one or more aspects of the present disclosure. The operations of method 1300 may be implemented by a device (such as, for example, a wireless repeater) or its components as described herein. For example, the operations of method 1300 may be performed by a communications manager as described with reference to FIGS. 9 through 12. In some examples, a device may execute a set of instructions to control the functional elements of the device to perform the functions described below. Additionally or alternatively, a device may perform aspects of the functions described below using special-purpose hardware.

At 1305, the device may receive a control interface triggering configuration from a base station, where the control interface triggering configuration includes power threshold information for powering of a control interface of the wireless device. The operations of 1305 may be performed according to the methods described herein. In some examples, aspects of the operations of 1305 may be performed by a control interface manager as described with reference to FIGS. 9 through 12.

At 1310, the device may receive, from the base station, a periodic signal during a configured time period. The operations of 1310 may be performed according to the methods described herein. In some examples, aspects of the operations of 1310 may be performed by a monitoring manager as described with reference to FIGS. 9 through 12.

At 1315, the device may measure one or more energy levels associated with the received periodic signal across the configured time period based on the received control interface triggering configuration. The operations of 1315 may be performed according to the methods described herein. In some examples, aspects of the operations of 1315 may be performed by an energy measurement manager as described with reference to FIGS. 9 through 12.

At 1320, the device may configure the control interface based on the one or more measured energy levels and the control interface triggering configuration. The operations of 1320 may be performed according to the methods described herein. In some examples, aspects of the operations of 1320 may be performed by a control interface manager as described with reference to FIGS. 9 through 12.

Figure 14:
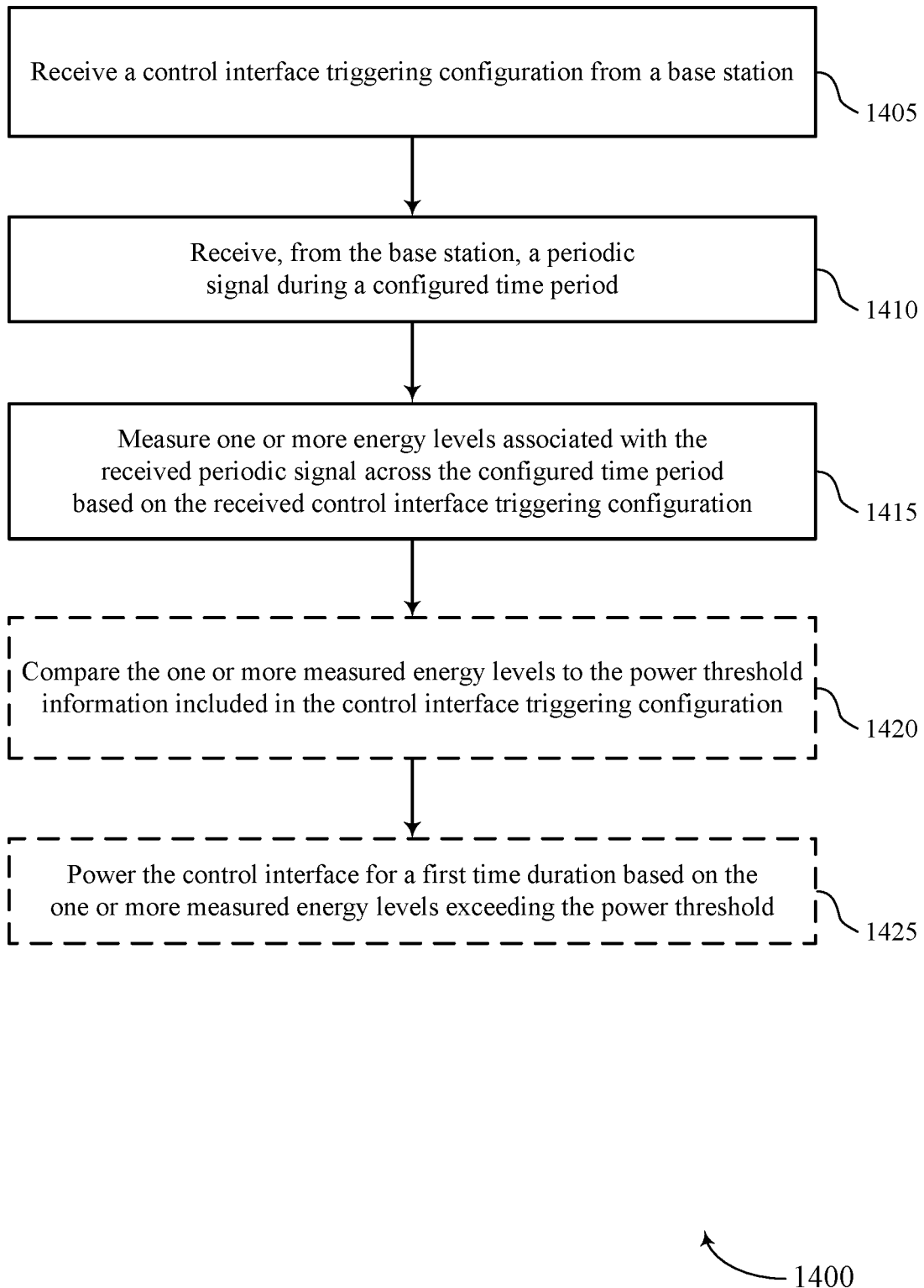

FIG. 14 shows a flowchart illustrating a method 1400 that supports power saving of smart repeaters based on a triggering signal in accordance with one or more aspects of the present disclosure. The operations of method 1400 may be implemented by a device or its components as described herein. For example, the operations of method 1400 may be performed by a communications manager as described with reference to FIGS. 9 through 12. In some examples, a device may execute a set of instructions to control the functional elements of the device to perform the functions described below. Additionally or alternatively, a device may perform aspects of the functions described below using special-purpose hardware.

At 1405, the device may receive a control interface triggering configuration from a base station, where the control interface triggering configuration includes power threshold information for powering of a control interface of the wireless repeater. The operations of 1405 may be performed according to the methods described herein. In some examples, aspects of the operations of 1405 may be performed by a control interface manager as described with reference to FIGS. 9 through 12.

At 1410, the device may receive, from the base station, a periodic signal during a configured time period. The operations of 1410 may be performed according to the methods described herein. In some examples, aspects of the operations of 1410 may be performed by a monitoring manager as described with reference to FIGS. 9 through 12.

At 1415, the device may measure one or more energy levels associated with the received periodic signal across the configured time period based on the received control interface triggering configuration. The operations of 1415 may be performed according to the methods described herein. In some examples, aspects of the operations of 1415 may be performed by an energy measurement manager as described with reference to FIGS. 9 through 12.

At 1420, the device may compare the one or more measured energy levels to the power threshold information, where the power threshold information includes a power threshold for the one or more measured energy levels, a power profile for the configured time period, or both. The operations of 1420 may be performed according to the methods described herein. In some examples, aspects of the operations of 1420 may be performed by an energy measurement manager as described with reference to FIGS. 9 through 12.

At 1425, the device may power the control interface for a first time duration based on the one or more measured energy levels exceeding the power threshold. The operations of 1425 may be performed according to the methods described herein. In some examples, aspects of the operations of 1425 may be performed by a control interface manager as described with reference to FIGS. 9 through 12.

Figure 15:
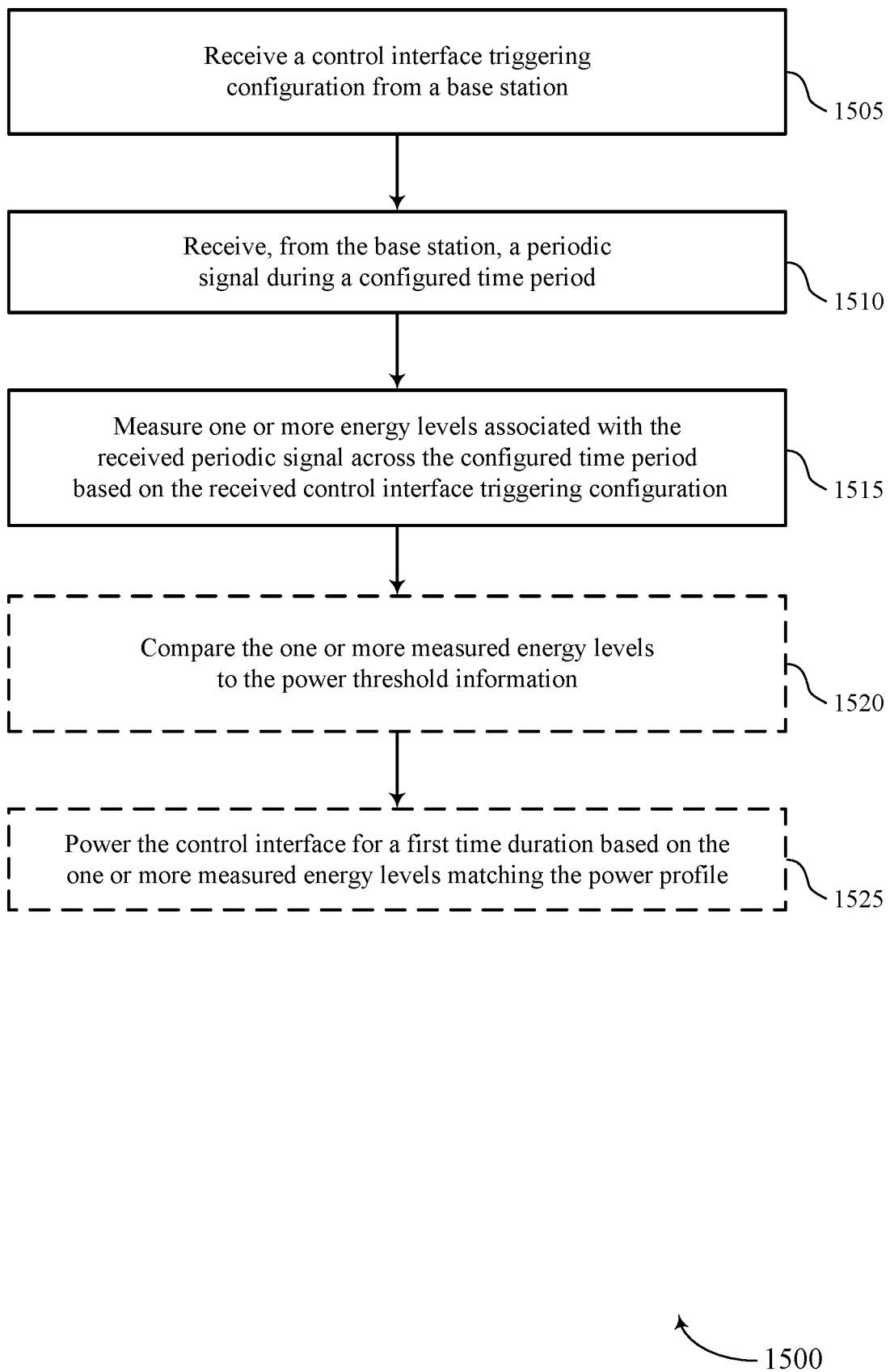

FIG. 15 shows a flowchart illustrating a method 1500 that supports power saving of smart repeaters based on a triggering signal in accordance with one or more aspects of the present disclosure. The operations of method 1500 may be implemented by a device or its components as described herein. For example, the operations of method 1500 may be performed by a communications manager as described with reference to FIGS. 9 through 12. In some examples, a device may execute a set of instructions to control the functional elements of the device to perform the functions described below. Additionally or alternatively, a device may perform aspects of the functions described below using special-purpose hardware.

At 1505, the device may receive a control interface triggering configuration from a base station, where the control interface triggering configuration includes power threshold information for powering of a control interface of the wireless repeater. The operations of 1505 may be performed according to the methods described herein. In some examples, aspects of the operations of 1505 may be performed by a control interface manager as described with reference to FIGS. 9 through 12.

At 1510, the device may receive, from the base station, a periodic signal during a configured time period. The operations of 1510 may be performed according to the methods described herein. In some examples, aspects of the operations of 1510 may be performed by a monitoring manager as described with reference to FIGS. 9 through 12.

At 1515, the device may measure one or more energy levels associated with the received periodic signal across the configured time period based on the received control interface triggering configuration. The operations of 1515 may be performed according to the methods described herein. In some examples, aspects of the operations of 1515 may be performed by an energy measurement manager as described with reference to FIGS. 9 through 12.

At 1520, the device may compare the one or more measured energy levels to the power threshold information, where the power threshold information includes a power threshold for the one or more measured energy levels, a power profile for the configured time period, or both. The operations of 1520 may be performed according to the methods described herein. In some examples, aspects of the operations of 1520 may be performed by an energy measurement manager as described with reference to FIGS. 9 through 12.

At 1525, the device may power the control interface for a first time duration based on the one or more measured energy levels matching the power profile. The operations of 1525 may be performed according to the methods described herein. In some examples, aspects of the operations of 1525 may be performed by a control interface manager as described with reference to FIGS. 9 through 12.

Figure 16:
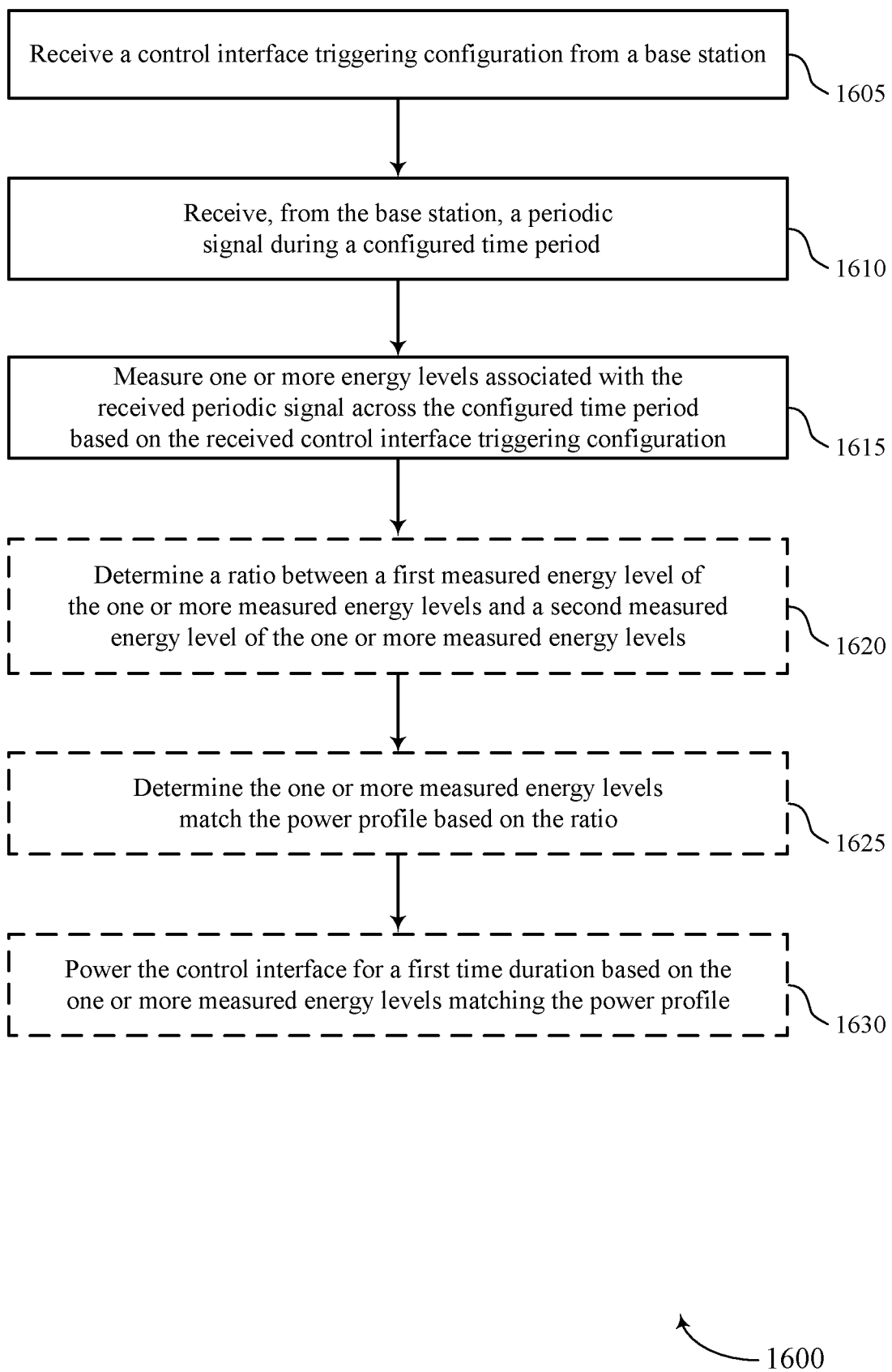

FIG. 16 shows a flowchart illustrating a method 1600 that supports power saving of smart repeaters based on a triggering signal in accordance with one or more aspects of the present disclosure. The operations of method 1600 may be implemented by a device or its components as described herein. For example, the operations of method 1600 may be performed by a communications manager as described with reference to FIGS. 9 through 12. In some examples, a device may execute a set of instructions to control the functional elements of the device to perform the functions described below. Additionally or alternatively, a device may perform aspects of the functions described below using special-purpose hardware.

At 1605, the device may receive a control interface triggering configuration from a base station, where the control interface triggering configuration includes power threshold information for powering of a control interface of the wireless repeater. The operations of 1605 may be performed according to the methods described herein. In some examples, aspects of the operations of 1605 may be performed by a control interface manager as described with reference to FIGS. 9 through 12.

At 1610, the device may receive, from the base station, a periodic signal during a configured time period. The operations of 1610 may be performed according to the methods described herein. In some examples, aspects of the operations of 1610 may be performed by a monitoring manager as described with reference to FIGS. 9 through 12.

At 1615, the device may measure one or more energy levels associated with the received periodic signal across the configured time period based on the received control interface triggering configuration. The operations of 1615 may be performed according to the methods described herein. In some examples, aspects of the operations of 1615 may be performed by an energy measurement manager as described with reference to FIGS. 9 through 12.

At 1620, the device may determine a ratio between a first measured energy level of the one or more measured energy levels and a second measured energy level of the one or more measured energy levels, where the first measured energy level includes a first average power level of a first set of symbols of the periodic signal and the second measured energy level includes a second average power level of a second set of symbols of the periodic signal. The operations of 1620 may be performed according to the methods described herein. In some examples, aspects of the operations of 1620 may be performed by an energy measurement manager as described with reference to FIGS. 9 through 12.

At 1625, the device may determine the one or more measured energy levels match the power profile based on the ratio. The operations of 1625 may be performed according to the methods described herein. In some examples, aspects of the operations of 1625 may be performed by an energy measurement manager as described with reference to FIGS. 9 through 12.

At 1630, the device may power the control interface for a first time duration based on the one or more measured energy levels matching the power profile. The operations of 1630 may be performed according to the methods described herein. In some examples, aspects of the operations of 1630 may be performed by a control interface manager as described with reference to FIGS. 9 through 12.

Figure 17:
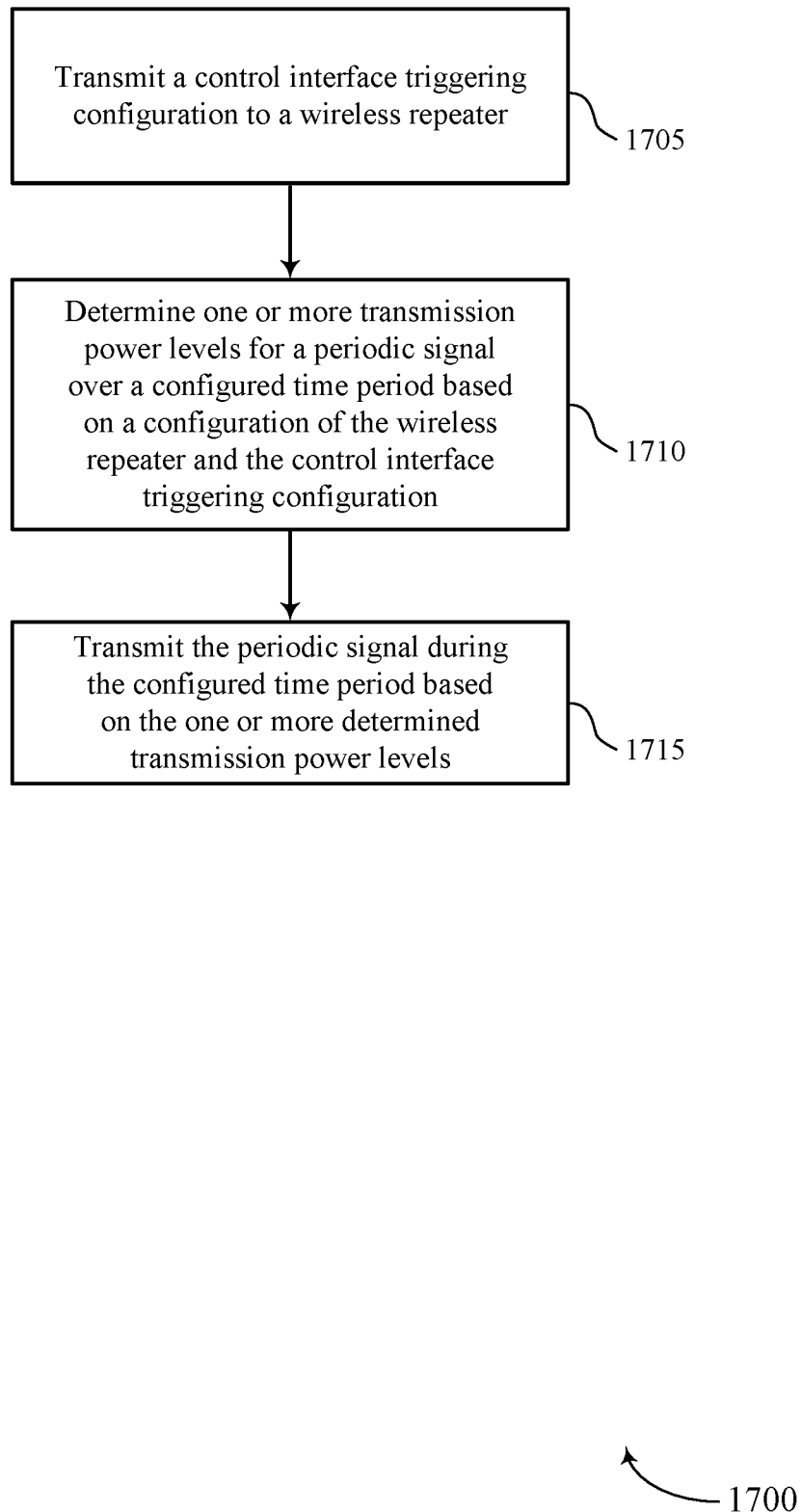

FIG. 17 shows a flowchart illustrating a method 1700 that supports power saving of smart repeaters based on a triggering signal in accordance with one or more aspects of the present disclosure. The operations of method 1700 may be implemented by a base station 105 or its components as described herein. For example, the operations of method 1700 may be performed by a communications manager as described with reference to FIGS. 5 through 8. In some examples, a base station may execute a set of instructions to control the functional elements of the base station to perform the functions described below. Additionally or alternatively, a base station may perform aspects of the functions described below using special-purpose hardware.

At 1705, the base station may transmit a control interface triggering configuration to a wireless repeater, where the control interface triggering configuration includes power threshold information for powering of a control interface of the wireless repeater. The operations of 1705 may be performed according to the methods described herein. In some examples, aspects of the operations of 1705 may be performed by a repeater control interface manager as described with reference to FIGS. 5 through 8.

At 1710, the base station may determine one or more transmission power levels for a periodic signal over a configured time period based on a configuration of the wireless repeater and the control interface triggering configuration. The operations of 1710 may be performed according to the methods described herein. In some examples, aspects of the operations of 1710 may be performed by a transmission power manager as described with reference to FIGS. 5 through 8.

At 1715, the base station may transmit the periodic signal during the configured time period based on the one or more determined transmission power levels. The operations of 1715 may be performed according to the methods described herein. In some examples, aspects of the operations of 1715 may be performed by a periodic signal manager as described with reference to FIGS. 5 through 8.

Figure 18:
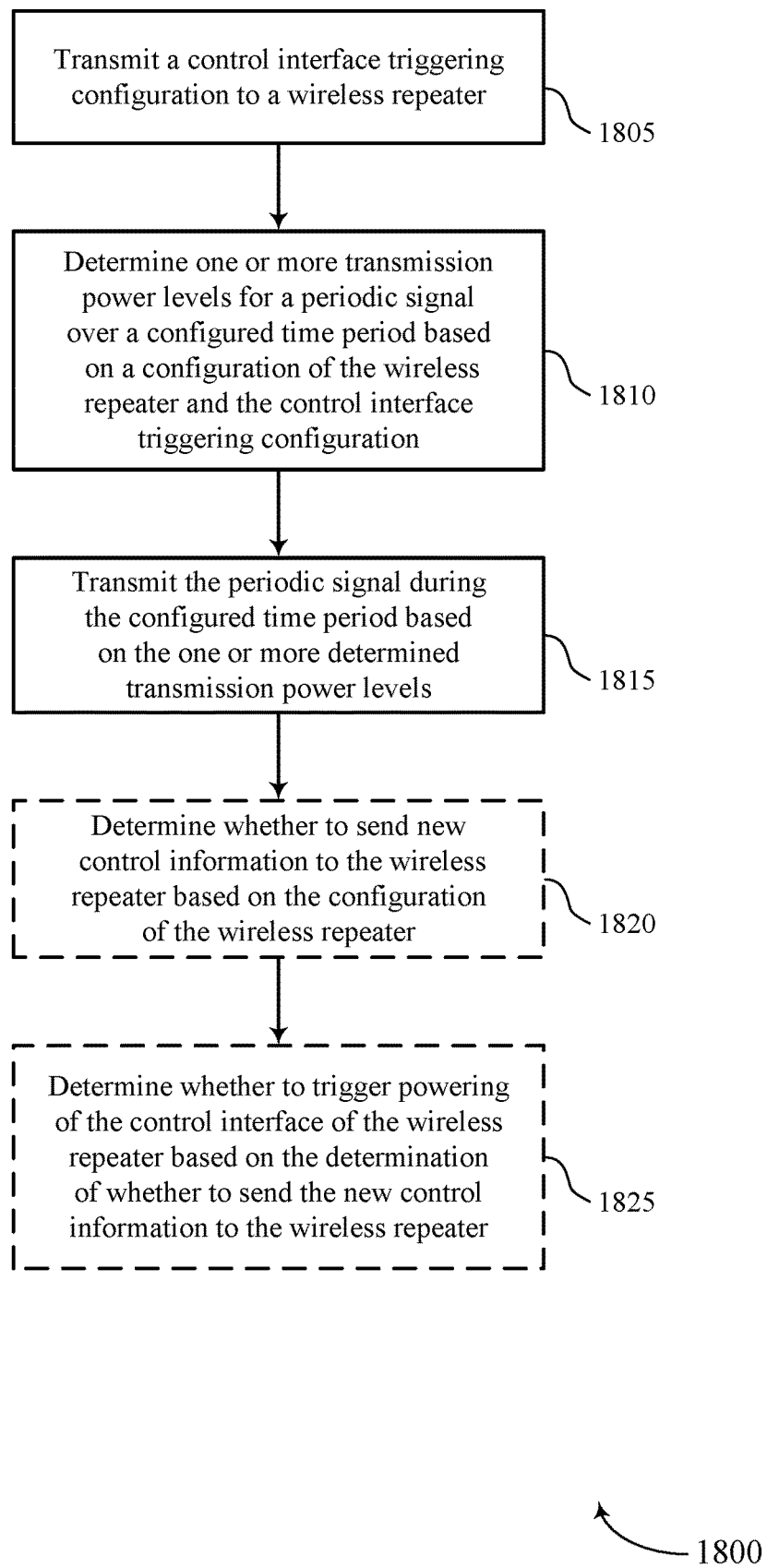

FIG. 18 shows a flowchart illustrating a method 1800 that supports power saving of smart repeaters based on a triggering signal in accordance with one or more aspects of the present disclosure. The operations of method 1800 may be implemented by a base station 105 or its components as described herein. For example, the operations of method 1800 may be performed by a communications manager as described with reference to FIGS. 5 through 8. In some examples, a base station may execute a set of instructions to control the functional elements of the base station to perform the functions described below. Additionally or alternatively, a base station may perform aspects of the functions described below using special-purpose hardware.

At 1805, the base station may transmit a control interface triggering configuration to a wireless repeater, where the control interface triggering configuration includes power threshold information for powering of a control interface of the wireless repeater. The operations of 1805 may be performed according to the methods described herein. In some examples, aspects of the operations of 1805 may be performed by a repeater control interface manager as described with reference to FIGS. 5 through 8.

At 1810, the base station may determine one or more transmission power levels for a periodic signal over a configured time period based on a configuration of the wireless repeater and the control interface triggering configuration. The operations of 1810 may be performed according to the methods described herein. In some examples, aspects of the operations of 1810 may be performed by a transmission power manager as described with reference to FIGS. 5 through 8.

At 1815, the base station may transmit the periodic signal during the configured time period based on the one or more determined transmission power levels. The operations of 1815 may be performed according to the methods described herein. In some examples, aspects of the operations of 1815 may be performed by a periodic signal manager as described with reference to FIGS. 5 through 8.

At 1820, the base station may determine whether to send new control information to the wireless repeater based on the configuration of the wireless repeater. The operations of 1820 may be performed according to the methods described herein. In some examples, aspects of the operations of 1820 may be performed by a repeater control information manager as described with reference to FIGS. 5 through 8.

At 1825, the base station may determine whether to trigger powering of the control interface of the wireless repeater based on the determination of whether to send the new control information to the wireless repeater. The operations of 1825 may be performed according to the methods described herein. In some examples, aspects of the operations of 1825 may be performed by a repeater control information manager as described with reference to FIGS. 5 through 8.

It should be noted that the methods described herein describe possible implementations, and that the operations and the steps may be rearranged or otherwise modified and that other implementations are possible. Further, aspects from two or more of the methods may be combined.

The following provides an overview of examples of the present invention:

Example 1

A method for wireless communication at a wireless repeater, comprising: receiving a control interface triggering configuration from a base station, wherein the control interface triggering configuration comprises power threshold information for powering of a control interface of the wireless repeater; receiving, from the base station, a periodic signal during a configured time period; measuring one or more energy levels associated with the received periodic signal across the configured time period based at least in part on the received control interface triggering configuration; and configuring the control interface based at least in part on the one or more measured energy levels and the control interface triggering configuration.

Example 2

The method of example 1, further comprising: comparing the one or more measured energy levels to the power threshold information, wherein the power threshold information comprises a power threshold for the one or more measured energy levels, a power profile for the configured time period, or both.

Example 3

The method of example 2, the configuring the control interface comprising: powering the control interface for a first time duration based at least in part on the one or more measured energy levels exceeding the power threshold.

Example 4

The method of example 3, further comprising: monitoring a control channel using the control interface for the first time duration based at least in part on powering on the control interface; receiving, from the base station, control information prior to expiration of the first time duration based at least in part on the monitoring of the control channel, wherein the control information comprises one or more commands for the control interface; and configuring the control interface based at least in part on the one or more commands.

Example 5

The method of any one of examples 3 through 4, further comprising: monitoring a control channel using the control interface for the first time duration based at least in part on powering on the control interface; and powering off the control interface upon expiration of the first time duration.

Example 6

The method of any one of examples 2 through 5, the configuring the control interface comprising: powering the control interface for a first time duration based at least in part on the one or more measured energy levels matching the power profile.

Example 7

The method of example 6, further comprising: monitoring a control channel using the control interface for the first time duration based at least in part on powering on the control interface; receiving, from the base station, control information prior to expiration of the first time duration based at least in part on the monitoring of the control channel, wherein the control information comprises one or more commands for the control interface; and configuring the control interface based at least in part on the one or more commands.

Example 8

The method of any one of examples 6 through 7, further comprising: monitoring a control channel using the control interface for the first time duration based at least in part on powering on the control interface; and powering off the control interface upon expiration of the first time duration.

Example 9

The method of any one of examples 6 through 8, further comprising: determining a ratio between a first measured energy level of the one or more measured energy levels and a second measured energy level of the one or more measured energy levels, wherein the first measured energy level comprises a first average power level of a first set of symbols of the periodic signal and the second measured energy level comprises a second average power level of a second set of symbols of the periodic signal; and determining the one or more measured energy levels match the power profile based at least in part on the ratio.

Example 10

The method of example 9, the comparing the one or more measured energy levels to the power threshold information comprising: comparing the ratio to the power profile.

Example 11

The method of example 10, wherein the comparing the one or more measured energy levels to the power threshold information comprising: comparing the ratio to the power profile.

Example 12

The method of any one of examples 2 through 11, the configuring the control interface comprising: transitioning to a low power state based at least in part on the one or more measured energy levels being less than the power threshold or different than the power profile.

Example 13

The method of any one of examples 2 through 12, wherein the power threshold for the one or more measured energy levels comprises a constant power envelope for the configured time period and wherein the power profile for the configured time period comprises an energy-time-variation pattern across the configured time period.

Example 14

The method of any one of examples 1 through 13, the measuring the one or more energy levels associated with the received periodic signal across the configured time period comprising: measuring a first average energy level of the received periodic signal across a first symbol of the configured time period; and measuring a second average energy level of the received periodic signal across one or more remaining symbols of the configured time period.

Example 15

The method of example 14, the configuring the control interface comprising: powering the control interface for a first time duration or transitioning to a low power state based at least in part on a difference between the first average energy level and the second average energy level.

Example 16

The method of example 15, wherein the power threshold information comprises the difference.

Example 17

The method of any one of examples 1 through 16, further comprising: performing an amplification operation on the received periodic signal; and transmitting the amplified periodic signal to a UE.

Example 18 the method of any one of examples 1 through 17, wherein the periodic signal comprises a synchronization signal block and the configured time period comprises four symbols of the synchronization signal block.

Example 19

An apparatus for wireless communication at a wireless repeater comprising at least one means for performing a method of any one of examples 1 through 18.

Example 20

An apparatus for wireless communication at a device in a wireless network comprising at least one means for performing a method of any one of examples 1 through 19.

Example 21

An apparatus for wireless communications at a base station comprising a processor and memory coupled to the processor, the processor and memory configured to perform a method of any one of examples 1 through 19.

Example 22

A non-transitory computer-readable medium storing code for wireless communication at a device in a wireless network, the code comprising instructions executable by a processor to perform a method of any one of examples 1 through 19.

Example 23

A method for wireless communications at a base station, comprising: transmitting a control interface triggering configuration to a wireless repeater, wherein the control interface triggering configuration comprises power threshold information for powering of a control interface of the wireless repeater; determining one or more transmission power levels for a periodic signal over a configured time period based at least in part on a configuration of the wireless repeater and the control interface triggering configuration; and transmitting the periodic signal during the configured time period based at least in part on the one or more determined transmission power levels.

Example 24

The method of example 23, further comprising: determining whether to send new control information to the wireless repeater based at least in part on the configuration of the wireless repeater; and determining whether to trigger powering of the control interface of the wireless repeater based at least in part on the determination of whether to send the new control information to the wireless repeater.

Example 25

The method of example 24, wherein the one or more transmission power levels for the periodic signal over the configured time period are determined based at least in part on the determination of whether to trigger powering of the control interface of the wireless repeater and the power threshold information.

Example 26

The method of any one of examples 23 through 25, further comprising: determining new control information for the wireless repeater; determining to trigger powering of the control interface of the wireless repeater based at least in part on the new control information, wherein at least one of the one or more transmission power levels are determined based at least in part on the determination to trigger powering of the control interface of the wireless repeater; and boosting the at least one of the one or more transmission power levels for the periodic signal.

Example 27

The method of example 26, the boosting the at least one of the one or more transmission power levels comprising: boosting the at least one of the one or more transmission power levels by a difference compared to a remainder of the one or more transmission power levels, wherein the power threshold information comprises the difference.

Example 28

The method of any one of examples 26 through 27, wherein the boosting is based at least in part on the power threshold information.

Example 29

The method of example 28, wherein the power threshold information comprises a power threshold for the one or more transmission power levels, a power profile for the configured time period, or both, wherein the power threshold for the one or more transmission power levels comprises a constant power envelope for the configured time period, and wherein the power profile for the configured time period comprises an energy-time-variation pattern across the configured time period.

Example 30

The method of any one of examples 26 through 29, further comprising: transmitting the new control information to the wireless repeater prior to expiration of a first time duration, wherein the control interface triggering configuration indicates the first time duration.

Example 31

The method of any one of examples 23 through 30, wherein the periodic signal comprises a synchronization signal block and the configured time period comprises four symbols of the synchronization signal block.

Example 32

An apparatus for wireless communication at a device in a wireless network comprising at least one means for performing a method of any one of examples 23 through 31.

Example 33

An apparatus for wireless communications at a base station comprising a processor and memory coupled to the processor, the processor and memory configured to perform a method of any one of examples 23 through 31.

Example 34

A non-transitory computer-readable medium storing code for wireless communication at a device in a wireless network, the code comprising instructions executable by a processor to perform a method of any one of examples 23 through 31.

Example 35

A method for wireless communication at a device in a wireless network, comprising: receiving a control interface triggering configuration from a base station, wherein the control interface triggering configuration comprises power threshold information for powering of a control interface of the device; receiving, from the base station, a periodic signal during a configured time period; measuring one or more energy levels associated with the received periodic signal across the configured time period based at least in part on the received control interface triggering configuration; and configuring the control interface based at least in part on the one or more measured energy levels and the control interface triggering configuration.

Example 36

The method of example 35, further comprising: comparing the one or more measured energy levels to the power threshold information, wherein the power threshold information comprises a power threshold for the one or more measured energy levels, a power profile for the configured time period, or both.

Example 37

The method of any one of examples 35 through 36, the measuring the one or more energy levels associated with the received periodic signal across the configured time period comprising: measuring a first average energy level of the received periodic signal across a first symbol of the configured time period; and measuring a second average energy level of the received periodic signal across one or more remaining symbols of the configured time period.

Example 38

An apparatus for wireless communication at a device in a wireless network comprising at least one means for performing a method of any one of examples 35 through 37.

Example 40

An apparatus for wireless communication at a device in a wireless network comprising a processor and memory coupled to the processor, the processor and memory configured to perform a method of any one of examples 35 through 37.

Example 42

A non-transitory computer-readable medium storing code for wireless communication at a device in a wireless network, the code comprising instructions executable by a processor to perform a method of any one of examples 35 through 37.

Techniques described herein may be used for various wireless communications systems such as code division multiple access (CDMA), time division multiple access (TDMA), frequency division multiple access (FDMA), orthogonal frequency division multiple (OFDM) access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell may cover a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a wireless repeater, comprising:

receiving a control interface triggering configuration from a network entity, wherein the control interface triggering configuration comprises power threshold information for powering of a control interface of the wireless repeater;

receiving, from the network entity, a periodic signal during a configured time period, wherein the periodic signal is different from the control interface triggering configuration, wherein the configured time period comprises at least one symbol of a reference signal, and wherein the power threshold information comprises a power profile for the configured time period;

measuring one or more energy levels associated with the received periodic signal across the configured time period based on the received control interface triggering configuration; and configuring the control interface based on the one or more measured energy levels and the control interface triggering configuration, wherein configuring the control interface comprises powering the control interface on or off for a first time duration based on the one or more measured energy levels matching the power profile, and wherein the control interface comprises digital circuitry configured to process control information communicated at the wireless repeater.

2. The method of claim 1, further comprising:
comparing the one or more measured energy levels to the power threshold information.
3. The method of claim 2, the configuring the control interface comprising:
powering the control interface for the first time duration based at least in part on the one or more measured energy levels exceeding the power threshold.
4. The method of claim 3, further comprising:
monitoring a control channel using the control interface for the first time duration based at least in part on powering on the control interface;
receiving, from the network entity, control information prior to expiration of the first time duration based at least in part on the monitoring of the control channel, wherein the control information comprises one or more commands for the control interface; and
configuring the control interface based at least in part on the one or more commands.
5. The method of claim 3, further comprising:
monitoring a control channel using the control interface for the first time duration based at least in part on powering on the control interface; and
powering off the control interface upon expiration of the first time duration.
6. The method of claim 2,
wherein the power threshold information further comprises a power threshold for the one or more measured energy levels.
7. The method of claim 1, further comprising:
monitoring a control channel using the control interface for the first time duration based at least in part on powering on the control interface;
receiving, from the network entity, control information prior to expiration of the first time duration based at least in part on the monitoring of the control channel, wherein the control information comprises one or more commands for the control interface; and
configuring the control interface based at least in part on the one or more commands.
8. The method of claim 1, further comprising:
monitoring a control channel using the control interface for the first time duration based at least in part on powering on the control interface; and
powering off the control interface upon expiration of the first time duration.
9. The method of claim 2, further comprising:
determining a ratio between a first measured energy level of the one or more measured energy levels and a second measured energy level of the one or more measured energy levels, wherein the first measured energy level comprises a first average power level of a first set of symbols of the periodic signal and the second measured energy level comprises a second average power level of a second set of symbols of the periodic signal; and
determining the one or more measured energy levels match the power profile based at least in part on the ratio.
10. The method of claim 9, wherein the comparing the one or more measured energy levels to the power threshold information further comprises:
comparing the ratio to the power profile.
11. The method of claim 10, wherein the power profile comprises a pattern of power variation across the first set of symbols of the periodic signal and the second set of symbols of the periodic signal.
12. The method of claim 2, the configuring the control interface comprising:
transitioning to a low power state based at least in part on the one or more measured energy levels being less than the power threshold or different than the power profile.
13. The method of claim 2, wherein the power threshold for the one or more measured energy levels comprises a constant power envelope for the configured time period and wherein the power profile for the configured time period comprises an energy-time-variation pattern across the configured time period.
14. The method of claim 1, the measuring the one or more energy levels associated with the received periodic signal across the configured time period comprising:
measuring a first average energy level of the received periodic signal across a first symbol of the configured time period; and
measuring a second average energy level of the received periodic signal across one or more remaining symbols of the configured time period.
15. The method of claim 14, the configuring the control interface comprising:
powering the control interface for the first time duration or transitioning to a low power state based at least in part on a difference between the first average energy level and the second average energy level.
16. The method of claim 15, wherein the power threshold information comprises the difference.
17. The method of claim 1, further comprising:
performing an amplification operation on the received periodic signal to generate an amplified periodic signal; and
transmitting the amplified periodic signal to a user equipment (UE).
18. The method of claim 1, wherein the periodic signal comprises a synchronization signal block associated with the reference signal and the configured time period comprises four symbols of the synchronization signal block.
19. A method for wireless communications at a network entity, comprising:
transmitting a control interface triggering configuration to a wireless repeater, wherein the control interface triggering configuration comprises power threshold information for powering of a control interface of the wireless repeater on or off for a first time duration based on one or more energy levels matching a power profile for a configured time period, wherein the power threshold information comprises the power profile, and wherein the control interface comprises digital circuitry configured to process control information communicated at the wireless repeater;
determining one or more transmission power levels for a periodic signal over the configured time period based on a configuration of the wireless repeater and the control interface triggering configuration, wherein the periodic signal is different from the control interface triggering configuration, and wherein the configured time period comprises at least one symbol of a reference signal; and
transmitting the periodic signal during the configured time period based on the one or more determined transmission power levels.
20. The method of claim 19, further comprising:
determining whether to send new control information to the wireless repeater based at least in part on the configuration of the wireless repeater; and determining whether to trigger powering of the control interface of the wireless repeater based at least in part on the determination of whether to send the new control information to the wireless repeater.

21. The method of claim 20, wherein the one or more transmission power levels for the periodic signal over the configured time period are determined based at least in part on the determination of whether to trigger powering of the control interface of the wireless repeater and the power threshold information.

22. The method of claim 19, further comprising:
determining new control information for the wireless repeater;
determining to trigger powering of the control interface of the wireless repeater based at least in part on the new control information, wherein at least one of the one or more transmission power levels are determined based at least in part on the determination to trigger powering of the control interface of the wireless repeater; and
boosting the at least one of the one or more transmission power levels for the periodic signal.

23. The method of claim 22, wherein the boosting the at least one of the one or more transmission power levels further comprises:
boosting the at least one of the one or more transmission power levels by a difference compared to a remainder of the one or more transmission power levels, wherein the power threshold information comprises the difference.

24. The method of claim 22, wherein the boosting is based at least in part on the power threshold information.

25. The method of claim 24, wherein the power threshold information further comprises a power threshold for the one or more transmission power levels, wherein the power threshold for the one or more transmission power levels comprises a constant power envelope for the configured time period, and wherein the power profile for the configured time period comprises an energy-time-variation pattern across the configured time period.

26. The method of claim 22, further comprising:
transmitting the new control information to the wireless repeater prior to expiration of the first time duration, wherein the control interface triggering configuration indicates the first time duration.

27. A method for wireless communication at a device in a wireless network, comprising:
receiving a control interface triggering configuration from a network entity, wherein the control interface triggering configuration comprises power threshold information for powering of a control interface of the device, and wherein the power threshold information comprises a power profile for a configured time period;
receiving, from the network entity, a periodic signal during the configured time period, wherein the periodic signal is different from the control interface triggering configuration, and wherein the configured time period comprises at least one symbol of a reference signal;
measuring one or more energy levels associated with the received periodic signal across the configured time period based on the received control interface triggering configuration; and
configuring the control interface based on the one or more measured energy levels matching the power profile and the control interface triggering configuration, wherein the power threshold information relates to powering the control interface on or off for a first time duration, and wherein the control interface comprises digital circuitry configured to process control information communicated at the device.

28. The method of claim 27, further comprising:
comparing the one or more measured energy levels to the power threshold information, wherein the power threshold information further comprises a power threshold for the one or more measured energy levels.

29. The method of claim 27, wherein measuring the one or more energy levels associated with the received periodic signal across the configured time period further comprises:
measuring a first average energy level of the received periodic signal across a first symbol of the configured time period; and
measuring a second average energy level of the received periodic signal across one or more remaining symbols of the configured time period.

30. An apparatus for wireless communication at a wireless device, comprising:
one or more memories; and
one or more processors coupled with the one or more memories configured to cause the wireless device to:
receive a control interface triggering configuration from a network entity, wherein the control interface triggering configuration comprises power threshold information to power a control interface of a wireless repeater;
receive, from the network entity, a periodic signal during a configured time period, wherein the periodic signal is different from the control interface triggering configuration, wherein the configured time period comprises at least one symbol of a reference signal, and wherein the power threshold information comprises a power profile for the configured time period;
measure one or more energy levels associated with the received periodic signal across the configured time period based on the received control interface triggering configuration; and
configure the control interface based on the one or more measured energy levels and the control interface triggering configuration to power the control interface on or off for a first time duration based on the one or more measured energy levels matching the power profile, and wherein the control interface comprises digital circuitry configured to process control information communicated at the wireless repeater.

31. The apparatus of claim 30, wherein the one or more processors are further configured to cause the wireless device to:
compare the one or more measured energy levels to the power threshold information.

32. The apparatus of claim 31, wherein the one or more processors are further configured to cause the wireless device to:
power the control interface for the first time duration based at least in part on the one or more measured energy levels that exceeds the power threshold.

33. The apparatus of claim 32, wherein the one or more processors are further configured to cause the wireless device to:
monitor a control channel using the control interface for the first time duration based at least in part on powering on the control interface;
receive, from the network entity, control information prior to expiration of the first time duration based at least in part on the monitor of the control channel, wherein the control information comprises one or more commands for the control interface; and configure the control interface based at least in part on the one or more commands.

34. The apparatus of claim 31, wherein the power threshold information further comprises a power threshold for the one or more measured energy levels.

35. The apparatus of claim 30, wherein the one or more processors are further configured to cause the wireless device to:

monitor a control channel using the control interface for the first time duration based at least in part on powering on the control interface;

receive, from the network entity, control information prior to expiration of the first time duration based at least in part on the monitor of the control channel, wherein the control information comprises one or more commands for the control interface; and configure the control interface based at least in part on the one or more commands.

36. The apparatus of claim 31, wherein the power threshold for the one or more measured energy levels comprises a constant power envelope for the configured time period and wherein the power profile for the configured time period comprises an energy-time-variation pattern across the configured time period.

37. An apparatus for wireless communication at a network entity, comprising:

one or more memories; and one or more processors coupled with the one or more memories configured to cause the network entity to:

transmit a control interface triggering configuration to a wireless repeater, wherein the control interface triggering configuration comprises power threshold information to power a control interface of the wireless repeater on or off for a first time duration based on one or more energy levels matching a power profile for a configured time period, wherein the power threshold information comprises the power profile, and wherein the control interface comprises digital circuitry configured to process control information communicated at the wireless repeater;

determine one or more transmission power levels for a periodic signal over the configured time period based on a configuration of the wireless repeater and the control interface triggering configuration, wherein the periodic signal is different from the control interface triggering configuration, and wherein the configured time period comprises at least one symbol of a reference signal; and transmit the periodic signal during the configured time period based on the one or more determined transmission power levels.

38. The apparatus of claim 37, wherein the one or more processors are further configured to cause the network entity to:

determine whether to send new control information to the wireless repeater based at least in part on the configuration of the wireless repeater; and determine whether to trigger powering of the control interface of the wireless repeater based at least in part on the determination of whether to send the new control information to the wireless repeater.

39. The apparatus of claim 38, wherein the one or more transmission power levels for the periodic signal over the configured time period are determined based at least in part on the determination of whether to trigger powering of the control interface of the wireless repeater and the power threshold information.

40. The apparatus of claim 37, wherein the one or more processors are further configured to cause the network entity to:

determine new control information for the wireless repeater;

determine to trigger powering of the control interface of the wireless repeater based at least in part on the new control information, wherein at least one of the one or more transmission power levels are determined based at least in part on the determination to trigger powering of the control interface of the wireless repeater; and boost the at least one of the one or more transmission power levels for the periodic signal.

41. An apparatus for wireless communication at a wireless device, comprising:

one or more memories; and one or more processors coupled with the one or more memories configured to cause the wireless device to:

receive a control interface triggering configuration from a network entity, wherein the control interface triggering configuration comprises power threshold information to power a control interface of a device, and wherein the power threshold information comprises a power profile for a configured time period;

receive, from the network entity, a periodic signal during the configured time period, wherein the periodic signal is different from the control interface triggering configuration, and wherein the configured time period comprises at least one symbol of a reference signal;

measure one or more energy levels associated with the received periodic signal across the configured time period based on the received control interface triggering configuration; and configure the control interface on the one or more measured energy levels matching the power profile and the control interface triggering configuration, wherein the power threshold information relates to powering the control interface on or off for a first time duration, and wherein the control interface comprises digital circuitry configured to process control information communicated at the device.

42. The apparatus of claim 41, wherein the one or more processors are further configured to cause the wireless device to:

compare the one or more measured energy levels to the power threshold information, wherein the power threshold information further comprises a power threshold for the one or more measured energy levels.

43. The apparatus of claim 41, wherein the one or more processors are further configured to cause the wireless device to:

measure a first average energy level of the received periodic signal across a first symbol of the configured time period; and measure a second average energy level of the received periodic signal across one or more remaining symbols of the configured time period.

44. A non-transitory computer-readable medium storing code for wireless communication at a device in a wireless communications system, the code comprising instructions executable by one or more processors to cause the device to:

receive a control interface triggering configuration from a network entity, wherein the control interface triggering configuration comprises power threshold information to power a control interface of a wireless repeater;

receive, from the network entity, a periodic signal during a configured time period, wherein the periodic signal is different from the control interface triggering configuration, wherein the configured time period comprises at least one symbol of a reference signal, and wherein the power threshold information comprises a power profile for the configured time period;

measure one or more energy levels associated with the received periodic signal across the configured time period based on the received control interface triggering configuration; and configure the control interface based on the one or more measured energy levels and the control interface triggering configuration to power the control interface on or off for a first time duration based on the one or more measured energy levels matching the power profile, and wherein the control interface comprises digital circuitry configured to process control information communicated at the wireless repeater.

45. The non-transitory computer-readable medium of claim 44, the code further comprising instructions executable by the one or more processors to cause the device to:
compare the one or more measured energy levels to the power threshold information.

46. The non-transitory computer-readable medium of claim 45, the code further comprising instructions executable by the one or more processors to cause the device to:
power the control interface for the first time duration based at least in part on the one or more measured energy levels that exceeds the power threshold.

47. The non-transitory computer-readable medium of claim 46, the code further comprising instructions executable by the one or more processors to cause the device to:
monitor a control channel using the control interface for the first time duration based at least in part on powering on the control interface;
receive, from the network entity, control information prior to expiration of the first time duration based at least in part on the monitoring of the control channel, wherein the control information comprises one or more commands for the control interface; and
configure the control interface based at least in part on the one or more commands.

48. The non-transitory computer-readable medium of claim 45, wherein the power threshold information further comprises a power threshold for the one or more measured energy levels.

49. The non-transitory computer-readable medium of claim 44, the code further comprising instructions executable by the one or more processors to cause the device to:
monitor a control channel using the control interface for the first time duration based at least in part on powering on the control interface;
receive, from the network entity, control information prior to expiration of the first time duration based at least in part on the monitoring of the control channel, wherein the control information comprises one or more commands for the control interface; and
configure the control interface based at least in part on the one or more commands.

50. The non-transitory computer-readable medium of claim 45, wherein the power threshold for the one or more measured energy levels comprises a constant power envelope for the configured time period and wherein the power profile for the configured time period comprises an energy-time-variation pattern across the configured time period.

51. An apparatus for wireless communication at a wireless repeater, comprising:
means for receiving a control interface triggering configuration from a network entity, wherein the control interface triggering configuration comprises power threshold information for powering of a control interface of the wireless repeater;
means for receiving, from the network entity, a periodic signal during a configured time period, wherein the periodic signal is different from the control interface triggering configuration, wherein the configured time period comprises at least one symbol of a reference signal, and wherein the power threshold information comprises a power profile for the configured time period;
means for measuring one or more energy levels associated with the received periodic signal across the configured time period based on the received control interface triggering configuration; and
means for configuring the control interface based on the one or more measured energy levels and the control interface triggering configuration, wherein configuring the control interface comprises powering the control interface on or off for a first time duration based on the one or more measured energy levels matching the power profile, and wherein the control interface comprises digital circuitry configured to process control information communicated at the wireless repeater.

52. The apparatus of claim 30, wherein the one or more processors are further configured to cause the wireless device to:
monitor a control channel using the control interface for the first time duration based at least in part on powering on the control interface; and
power off the control interface upon expiration of the first time duration.

53. The apparatus of claim 31, wherein the one or more processors are further configured to cause the wireless device to:
determine a ratio between a first measured energy level of the one or more measured energy levels and a second measured energy level of the one or more measured energy levels, wherein the first measured energy level comprises a first average power level of a first set of symbols of the periodic signal and the second measured energy level comprises a second average power level of a second set of symbols of the periodic signal; and
determine the one or more measured energy levels match the power profile based at least in part on the ratio.

54. The apparatus of claim 53, wherein the one or more processors configured to cause the wireless device to compare the one or more measured energy levels to the power threshold are configured to cause the wireless device to:
compare the ratio to the power profile, wherein the power profile comprises a pattern of power variation across the first set of symbols of the periodic signal and the second set of symbols of the periodic signal.

55. The apparatus of claim 31, wherein the one or more processors configured to cause the wireless device to configure the control interface are configured to cause the wireless device to:
transition to a low power state based at least in part on the one or more measured energy levels being less than the power threshold or different than the power profile.

56. The apparatus of claim 30, wherein the one or more processors configured to cause the wireless device to measure the one or more energy levels associated with the received periodic signal across the configured time period are configured to cause the wireless device to:
- measure a first average energy level of the received periodic signal across a first symbol of the configured time period; and
- measure a second average energy level of the received periodic signal across one or more remaining symbols of the configured time period.

57. A non-transitory computer-readable medium storing code for wireless communication at a device in a wireless communications system, the code comprising instructions executable by one or more processors to cause the device to:
- transmit a control interface triggering configuration to a wireless repeater, wherein the control interface triggering configuration comprises power threshold information for powering of a control interface of the wireless repeater on or off for a first time duration based on one or more energy levels matching a power profile for a configured time period, wherein the power threshold information comprises the power profile, and wherein the control interface comprises digital circuitry configured to process control information communicated at the wireless repeater;
- determine one or more transmission power levels for a periodic signal over the configured time period based on a configuration of the wireless repeater and the control interface triggering configuration, wherein the periodic signal is different from the control interface triggering configuration, and wherein the configured time period comprises at least one symbol of a reference signal; and
- transmit the periodic signal during the configured time period based on the one or more determined transmission power levels.

58. A non-transitory computer-readable medium storing code for wireless communication at a device in a wireless communications system, the code comprising instructions executable by one or more processors to cause the device to:
- receive a control interface triggering configuration from a network entity, wherein the control interface triggering configuration comprises power threshold information for powering of a control interface of the device, and wherein the power threshold information comprises a power profile for a configured time period;
- receive, from the network entity, a periodic signal during the configured time period, wherein the periodic signal is different from the control interface triggering configuration, and wherein the configured time period comprises at least one symbol of a reference signal;
- measure one or more energy levels associated with the received periodic signal across the configured time period based on the received control interface triggering configuration; and
- configure the control interface based on the one or more measured energy levels matching the power profile and the control interface triggering configuration, wherein the power threshold information relates to powering the control interface on or off for a first time duration, and wherein the control interface comprises digital circuitry configured to process control information communicated at the device.

* * * * *